(12) United States Patent
Smith et al.

(10) Patent No.: US 7,974,808 B2
(45) Date of Patent: Jul. 5, 2011

(54) METHODS AND APPARATUS FOR USING BLACK BOX DATA TO ANALYZE VEHICULAR ACCIDENTS

(75) Inventors: Darrin A. Smith, San Antonio, TX (US); Scott Paimer, San Antonio, TX (US)

(73) Assignee: Injury Sciences LLC, San Antonio, TX (US)

( * ) Notice: Subject to any disclaimer, the term of this patent is extended or adjusted under 35 U.S.C. 154(b) by 0 days.

(21) Appl. No.: 12/728,394

(22) Filed: Mar. 22, 2010

(65) Prior Publication Data

US 2010/0228432 A1     Sep. 9, 2010

Related U.S. Application Data

(62) Division of application No. 12/069,603, filed on Feb. 12, 2008, now Pat. No. 7,716,002, which is a division of application No. 10/166,866, filed on Jun. 11, 2002, now Pat. No. 7,359,821.

(51) Int. Cl.
*G06F 19/00*     (2011.01)

(52) U.S. Cl. ....................................... 702/113

(58) Field of Classification Search .................... 702/113
See application file for complete search history.

(56) References Cited

U.S. PATENT DOCUMENTS

| | | | |
|---|---|---|---|
| 4,435,769 A | 3/1984 | Nagano et al. | 364/464 |
| 4,505,351 A * | 3/1985 | Nishikawa et al. | 180/169 |
| 5,128,859 A | 7/1992 | Carbone et al. | 364/401 |
| 5,317,503 A | 5/1994 | Inoue | 364/400 |
| 5,377,098 A | 12/1994 | Sakai | 364/406 |
| 5,432,904 A | 7/1995 | Wong | 395/161 |
| 5,469,628 A | 11/1995 | Chartrand | 33/608 |
| 5,504,674 A | 4/1996 | Chen et al. | 364/401 |
| 5,657,233 A | 8/1997 | Cherrington et al. | 364/464.3 |
| 5,657,460 A | 8/1997 | Egan et al. | 395/326 |
| 5,718,451 A * | 2/1998 | White | 280/735 |
| 5,839,112 A | 11/1998 | Schreitmueller et al. | 705/4 |
| 5,950,169 A | 9/1999 | Borghesi et al. | 705/4 |
| 6,052,631 A | 4/2000 | Busch et al. | 701/29 |
| 6,246,933 B1 * | 6/2001 | Bague | 701/35 |
| 6,381,561 B1 | 4/2002 | Bomar, Jr. et al. | 703/8 |
| 6,609,053 B1 * | 8/2003 | Breed | 701/45 |
| 6,711,495 B1 | 3/2004 | Ukai et al. | 701/207 |

(Continued)

FOREIGN PATENT DOCUMENTS

EP     0 644 501 A1     9/1994

(Continued)

OTHER PUBLICATIONS

Don Gilman, Automotive Black Box Data Recovery Systems, publish before fall 1999, bottom of p. 6, p. 1-7.*

(Continued)

*Primary Examiner* — Tung S Lau
(74) *Attorney, Agent, or Firm* — Trop, Pruner & Hu, P.C.

(57) ABSTRACT

Disclosed are methods and apparatus for using black box data to analyze vehicular accidents. The methods include obtaining information from an event data recorder associated with a vehicle and using the data obtained therefrom in determining and analyzing the vehicular accident. Attributes to be analyzed include impact severity, change in velocity, and other desired parameters. Further disclosed are methods to securely communicate the downloaded black box information to a secure location for later analysis and processing.

14 Claims, 21 Drawing Sheets

U.S. PATENT DOCUMENTS

| | | | |
|---|---|---|---|
| 6,735,506 B2* | 5/2004 | Breed et al. | 701/36 |
| 6,882,912 B2* | 4/2005 | DiLodovico et al. | 701/35 |
| 6,950,013 B2 | 9/2005 | Scaman et al. | 340/436 |
| 7,239,945 B2 | 7/2007 | Hiemer et al. | 701/29 |
| 2001/0000886 A1* | 5/2001 | Breed et al. | 180/274 |
| 2001/0005804 A1 | 6/2001 | Rayner | 701/35 |
| 2002/0103622 A1 | 8/2002 | Burge | 702/183 |
| 2002/0105438 A1* | 8/2002 | Forbes et al. | 340/901 |
| 2002/0111725 A1 | 8/2002 | Burge et al. | 701/29 |
| 2003/0036892 A1* | 2/2003 | Burge et al. | 703/8 |
| 2003/0200123 A1 | 10/2003 | Burge et al. | 705/4 |
| 2005/0125127 A1* | 6/2005 | Bomar et al. | 701/45 |

FOREIGN PATENT DOCUMENTS

| | | |
|---|---|---|
| EP | 1 338 883 A1 | 8/2003 |
| WO | PCT/US99/02307 | 3/1999 |
| WO | WO 99/40529 | 8/1999 |
| WO | WO 2005/041071 A1 | 5/2005 |

OTHER PUBLICATIONS

Auto Damage Repair Report, National Property & Casualty Claims Research Services, Inc., Feb. 2002, No. 349, p. 1-4.*

U.S. Appl. No. 10/046,846, filed Jan. 2002, Bomar et al.* http://209.161.33.50/dictionary/deduction, p. 1.* http://www.m-w.com/dictionary/acceleration, p. 1.* http://www.m-w.com/dictionary/calibrating, p. 1.* http://www.m-w.com/dictionary/compare, p. 1.* http://www.m-w.com/dictionary/different, p. 1.*

Partnership Aims to Make 'Black Box' Analysis Available for Auto Insurance, National news, Sep. 2000, p. 1.*

Don Gilman, Automotive Black Box Data Recovery Systems, Aug. 8, 2001.*

McHenry and McHenry, "A Revised Damage Analysis Procedure for the Crash Computer Program," *Thirtieth Stapp Car Crash Conference Proceedings P-189*, Oct. 1986, pp. 333-344. SAE #861894.

Siegmund, Bailey and King, "Characteristics of Specific Automobile Bumpers in Low-Velocity Impacts," *Accident Reconstruction: Technology and Animation SP-1030*, Feb. 1994, pp. 333-370. SAE #940916.

King Siegmund and Bailey, "Automobile Bumper Behavior in Low-Speed Impacts," *International Congress and Exposition* Detroit, Michigan, Mar. 1993. SAE #930211.

Bailey, Wong, and Lawrence, "Data Methods for Estimating the Severity of Minor Impacts," *Accident Reconstruction: Technology and Animation V SP-1083*, Feb. 1995, pp. 135-175. SAE #950352.

U.S. Appl. No. 10/046,846, filed Jan. 14, 2002, Bomar, Jr. et al.

U.S. Appl. No. 09/018,632, filed Feb. 4, 1998, Kidd et al.

Hight and Fugger, "Automobile Damage Scales and the Effect on Injury Analysis," *Accident Reconstruction: Technology and Animation II SP-907*, Feb. 1992, pp. 117-127. SAE #920602.

Woolley, Strother, and James, "Rear Stiffness Coefficients Derived from Barrier Test Data," *Accident Reconstruction: Technology and Animation SP853*, Feb. 1991, pp. 9-24. SAE #910120.

Prasad, "CRASH3 Damage Algorithm Reformulation for Front and Rear Collisions," *Accident Reconstruction: Human, Vehicle and Environmental Factors SP-814*, Feb. 1990, pp. 1-10. SAE #900098.

Bailey, King, Romilly and Thomson, "Characterization of Automotive Bumper Components for Low Speed Impacts," *Proceedings of the Candian Multidisciplinary Road Safety Conference VII*, Jun. 1991, pp. 190-203.

Howard, Bomar and Bare, "Vehicle Restitution Response in Low Velocity Collisions," *1993 SAE Future Transportation Technology Conference* San Antonio, Texas, Aug. 1993, pp. 1-10. SAE #90098.

Robinette, Fay and Paulsen, "Delta-V: Basic Concepts, Computational Methods, and Misunderstandings," *Accident Reconstruction: Technology and Animation IV SP-1030*, Feb. 1994, pp. 309-332. SAE #940915.

Campbell, "Energy Basis for Collision Severity," 1974. SAE #740565.

Strother, Wooley, and James, "A Comparison Between NHTSA Crash Test Data and CRASH3 Frontal Stiffness Coefficients," *Accident Reconstruction: Human, Vehicle and Environmental Factors SP-814*, Feb. 1990, pp. 27-37. SAE #900101.

Prasad, "Energy Absorbing Properties of Vehicle Structures and Their Use in Estimating Impact Severity in Automobile Collisions," *IMechE*, 1992, pp. 61-72. SAE #925209.

Siddall and Day, "Updating the Vehicle Class Categories," *Accident Reconstruction: Technology and Animation VI SP-1150*, Feb. 1996, pp. 271-280. SAE #960897.

Prasad, "Energy Dissipated in Vehicle Crush—A Study sing the Repeated Test Technique," *Vehicle Crashworthiness and Occupant Protection in Frontal Collisions SP-807*, Feb. 1990, pp. 17-27. SAE #900412.

Siegmund, King and Montgomery, "Using Barrier Impact Data to Determine Speed Change in Aligned, Low-Speed Vehicle to Vehicle Collisions," *Accident Reconstruction: Technology and Animation VI SP-1150*, pp. 147-168. SAE #960887.

Strother, Wooley, James and Warner, "Crush Energy in Accident Reconstruction," *Passenger Comfort, Convenience and Safety: Test Tools and Procedures P-174*, Feb. 1986, pp. 257-273. SAE #860371.

"Use of Biomechanics to Respond to Low Impact Soft Tissue Cases," Nebraska Department of Insurance Newsletter (Frauds Division), vol. 1—Spring 1998, pp. 1-4.

WREXPERT—Product Review, Biodynamics Research Corporation, [retrieved Feb. 26, 2000]. Retrieved from the Internet <URL: www.biodynamicresearch.com/wrexpert.htm>.

Hays, "Biomechanics help fix auto fraud woes," National Underwriters (Property & Casualty/Risk & Benefits Management), vol. 102, No. 37, Sep. 1998, pp. 10-11+.

McHenry Software (m-crash), 1995 [retrieved on Apr. 26, 2000]. Retrieved from Internet <URL: www.mchenrysoftware.com>.

Bonnett, "Understanding Delta V from Damage," 1996, [retrieved on Apr. 26, 2000]. Retrieved from Internet <URL: www.rec-tec.com/deltav.html>.

WinCRASH, ARSoftware [retrieved on Apr. 26, 2000]. Retrieved from Internet <URL: www.arsoftware.com/arsw.htm>.

EDCRASH, Engineering Dynamics Corporation, , [retrieved on Apr. 26, 2000]. Retrieved from Internet <URL: www.edccorp.com>.

CRASHEX, Fonda Engineering Associates, , [retrieved on Apr. 26, 2000]. Retrieved from Internet <URL: www.crashex.com>.

Nilsson-Ehle, A. (1983), "Energy-Based determination of velocity change in traffic accidents," International Journal of Vehicle Design, vol. 4, No. 2, pp. 126-135.

Branch, "Least Squares Collision Reconstruction," Detraoit, MI, Eng, 1987, pp. 31-40.

Grimes, et al., "Developing a Crush Profile Estimate by Balancing Impact Forces," Proceedings of the 1997 International Congress and Exposition, Detroit, MI, USA, Feb. 24-27, 1997, pp. 1-20.

Prasad, "Coefficient of Restitution of Vehicle Stuctures and Its Use in Estimating the Total Delta V in Automobile Collisions," Winter Annual Meeting of ht eAmerican Society of Mechanical Engineers; Atlanta, GA, USA, Dec. 1-6, 1991, vol. 126, 1991, pp. 217-246.

White, "How Much Information Should Cars Have?" Wall Street Journal, Mar. 20, 2002.

Haggerty, "German Auto Repair Test Helps Control Insurance Rates," National Underwriter, Bol. 94, No. 15, Apr. 9, 1990, start p. 46 (2).

PCT/US2007/13214 International Search Report with Written Opinion of the International Searching Authority Mailed Sep. 19, 2008.

PCT/US2007/013215 International Search Report with Written Opinion of the International Searching Authority Mailed Sep. 14, 2009.

European Patent Office, Communication Pursuant to Article 94(3) EPC dated Dec. 28, 2009 in European patent application No. 07809319.2-1236/2030139.

* cited by examiner

Vetronix Crash Data Retrieval Tool    0G4K00000X00000000 - [Deployment Data Summary]

File  Edit  View  Run  Window  Help  Special

0G4K00000X00000000    System Status At Deployment

| | |
|---|---|
| SIR Warning Lamp Status | OFF |
| Driver's Belt Switch Circuit Status | UNBUCKLED |
| Passenger Front Air Bag Suppression Switch Circuit Status | ON |
| Ignition Cycles At Deployment | 187 |
| Ignition Cycles At Investigation | 213 |
| Time From Algorithm Enable to Deployment Command Criteria Met (msec) | 18.75 |
| Time From Algorithm Enable to Pretensioner Deployment Command Criteria Met (msec) | 18.75 |
| Time From Near Deployment To Deployment (msec) | N/A |

| Time (milliseconds) | 10 | 20 | 30 | 40 | 50 | 60 | 70 | 80 | 90 | 100 | 110 | 120 | 130 | 140 | 150 |
|---|---|---|---|---|---|---|---|---|---|---|---|---|---|---|---|
| Recorded Velocity Change (MPH) | -1.54 | -3.07 | -3.51 | -5.27 | -7.66 | -10.09 | -12.29 | -16.24 | -21.50 | -27.86 | -32.69 | -39.93 | -42.78 | -43.44 | -44.32 |

| Time (milliseconds) | 160 | 170 | 180 | 190 | 200 | 210 | 220 | 230 | 240 | 250 | 260 | 270 | 280 | 290 | 300 |
|---|---|---|---|---|---|---|---|---|---|---|---|---|---|---|---|
| Recorded Velocity Change (MPH) | -44.98 | -45.42 | -46.07 | -46.95 | -47.17 | -47.17 | -47.17 | -47.17 | -47.17 | -47.17 | -47.17 | -47.17 | -47.17 | -47.17 | -47.17 |

PRE-CRASH DATA

| Seconds Before AE | Vehicle Speed (MPH) | Engine Speed (RPM) | Percent Throttle | Brake Switch Circuit Status |
|---|---|---|---|---|
| -5 | 57 | 4032 | 100 | OFF |
| -4 | 65 | 4160 | 70 | OFF |
| -3 | 62 | 2304 | 2 | ON |
| -2 | 55 | 1088 | 2 | ON |
| -1 | 47 | 896 | 2 | ON |

File loaded    Events: DEPLOYMENT  NEAR-DEPLOYMENT  NO Interface

FIG. 1

METHODS AND APPARATUS FOR USING BLACK BOX DATA TO ANALYZE VEHICULAR ACCIDENTS

This application is a divisional of U.S. patent application Ser. No. 12/069,603 filed Feb. 12, 2008, now U.S. Pat. No. 7,716,002, issued May 11, 2010 entitled "METHODS AND APPARATUS FOR USING BLACK BOX DATA TO ANALYZE VEHICULAR ACCIDENTS," which is a divisional of U.S. patent application Ser. No. 10/166,866 filed Jun. 11, 2002, now U.S. Pat. No. 7,359,821 which issued on Apr. 15, 2008, the content of which is hereby incorporated by reference.

BACKGROUND

The present invention relates to methods and apparatus for use of so-called "black box" data, obtained from an event data recorder in connection with analysis of a vehicular accident.

Today, numerous "black box" technologies exist to provide auto crash investigators, insurance companies and legal counsel with significant information regarding a car accident. These technologies include after-market solutions that may include GPS capabilities, video capture, and storage of crash data. These technologies also include OEM solutions. All of these "black box" solutions may be referred to as "event data recorder" or EDR technologies. For purposes of this disclosure, the terms EDR, "black box", and CDR ("crash data retrieval") will be used interchangeably.

Presently, black box data may be used by investigators, insurance companies, and others to help in the determination of the circumstances surrounding a vehicle accident. Typically, this data consists of pre-crash and post-crash information. The information may be used by an investigator or other interested party to aid in the analysis of the accident and aid the determination of cause therefore based on the information. However, there are limitations in the use of such data, and presently such data is only used by individuals having significant expertise in accident reconstruction. Further, black box data is not currently used in connection with other computer-based vehicular accident analysis tools.

SUMMARY OF THE INVENTION

In one aspect, the present invention includes a computer-implemented method for analyzing a collision between a first vehicle and a second vehicle, including obtaining information from an event data recorder associated with one of the vehicles; communicating the information to a computer system; and utilizing the information in determining an impact severity of at least one of the vehicles. In a further aspect, the present invention includes a computer-implemented method for assessing impact severity of an accident involving a vehicle, including receiving information obtained from an event data recorder associated with the vehicle, and determining the impact severity using the information.

Further aspects of the present invention include a computer-implemented method for analyzing information obtained from an event data recorder, including determining from a first data field obtained from the recorder whether a passive restraint system was in use; applying a preselected set of rules to the data field to determine a probability of interior interaction and occupant movement; and reporting these parameters.

Another aspect resides in a computer-implemented method for adjusting a change in velocity as determined by an event data recorder, including obtaining the change in velocity, and modifying it by preselected values to obtain a low and high limit change in velocity. Such low and high limits may then be used in connection with a Monte Carlo simulation.

Yet another aspect resides in a computer-implemented method for determining a calculated impact severity for a vehicle involved in an accident, including receiving change in velocity data from an event data recorder associated with the vehicle; determining a first calculation of impact severity using the change in velocity data; obtaining a second calculation of impact severity determined without the change in velocity data; and combining the first and second calculations of impact severity to obtain the calculated impact severity. In certain embodiments, the first and/or second calculations may be weighted in accordance with predetermined rules prior to combining.

A still further aspect resides in a computer-implemented method for determining impact severity, including receiving damage information regarding two vehicles; accepting a description of pre-collision information regarding the vehicles; determining a point of impact and a principal direction of force for each of the vehicles; receiving data from an event data recorder associated with said one of the vehicles; and determining impact severity for the second vehicle based on the input and determined data.

Yet a further aspect resides in a computer-implemented method for determining impact severity of a collision between vehicles, including receiving information obtained from an event data recorder associated with one of the vehicles; calculating momentum vectors for the vehicle having the recorder using change in velocity information; and determining a momentum vector for the other second vehicle based on the momentum vectors of the first vehicle. In certain embodiments, the change in velocity information may be adjusted prior to determination of the momentum vectors to account for any errors inherent in the EDR.

It is to be understood that all of the aspects described above and throughout the specification may be implemented as computer-implemented methods, and may further be resident on one or more computer-readable media, and/or resident on one or more data processing systems.

BRIEF DESCRIPTION OF THE DRAWINGS

The present invention may be better understood, and its numerous objects, features, and advantages made apparent to those skilled in the art by referencing the accompanying drawings.

FIG. 1 is a screen shot of an exemplary software program setting forth data obtained from an event data recorder.

The use of the same reference symbols in different drawings indicates similar or identical items.

DETAILED DESCRIPTION

Figure 2:
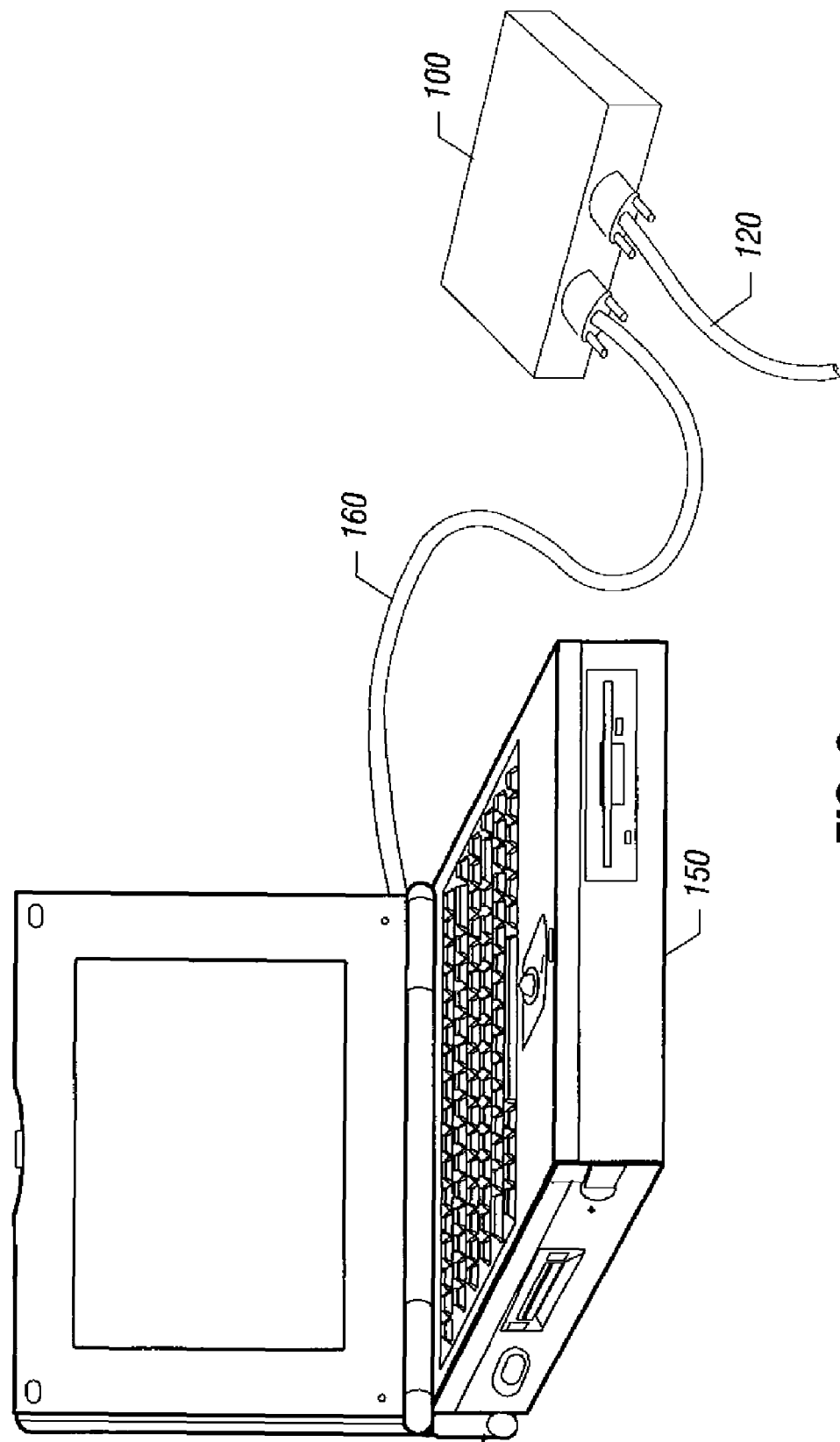
FIG. 2 is a drawing of equipment used to obtain black box information from an event data recorder.

For purposes of this disclosure, the discussion of preferred embodiments will focus on EDR technologies that are available as original equipment to private passenger automobiles, trucks, vans and SUVs. This is because OEM technology has significant advantages over after-market solutions. These include: 1) the significant cost and coordination of each installation of the technology is avoided; 2) unique or customized tracking systems to recognize equipped vehicles are not required; 3) OEM technology has critical mass in the marketplace; and 4) OEM technology has a more established track record as valid, acceptable evidence in litigated matters. However, it is to be understood that the present invention also applies equally to after market solutions.

As original equipment, the EDR may be implemented as the vehicle's SDM (sensing and diagnostic module), RCM (restraint control module) or other similar device that controls deployment of occupant protection systems. During a crash event, these systems will "wake up" or become activated and, if the system determines that a crash is severe enough to warrant airbag deployment, for example, the airbag will be discharged. Depending on the make and model of the vehicle, various elements of pre-crash and post-crash data may be saved which may be subsequently harvested for analysis of what actually happened during the accident event.

GM is the first manufacturer to allow equipment available to the general public to access and retrieve EDR information. By the third quarter of 2002, Ford may follow suit with several of its more popular models. For these reasons, the functionality of GM EDR system features will be discussed as an example embodiment unless otherwise noted. In an example embodiment, a commercially available data retrieval system, such as the VETRONIX Crash Data Retrieval (CDR) system, may be used to access and retrieve the information. The example embodiment shown in FIG. 1 is a screen shot from a software program commercially available from VETRONIX, Santa Barbara, Calif. FIG. 1 provides a summary of data that can be downloaded from an OEM EDR on selected GM models in an example embodiment. Notable information contained in the data available includes the following.

First, status of driver seatbelt usage at the time of the accident is recorded. Although this indicator can be positive when the seatbelt harness is fastened, but not around the occupant, this information could be relevant to comparative or contributory negligence determinations when seatbelt use is at issue. This information can also be used to determine occupant kinematics during the collision. Further, vehicle ignition cycle count at the time of accident, as well as at the time the "black box" data was harvested, is available. Although current EDR technology does not capture the date of the accident, ignition cycle counts (i.e., the number of times the ignition switch has been turned on and off) give an indication of the amount of usage a vehicle experiences after an accident but before the data is collected.

Also, longitudinal post-crash vehicle velocity changes (or Delta-V), in mph, at 10 milliseconds increments for the first 300 milliseconds after a collision is recorded. This is crash pulse information that defines the severity of the collision not only in magnitude, but also in duration. Also, pre-crash information regarding vehicle speed (mph), engine speed (rpm), percent throttle and braking status (i.e., on or off) at one second intervals for five seconds prior to impact is recorded.

In another example embodiment, the Vetronix CDR system may harvest data from selected Ford models. Although pre-crash data will not be initially harvestable from these models, the information available will include, but not be limited to, the following: longitudinal or forward Delta-V data, lateral Delta-V data, driver seat belt status, and passenger seat belt status. While discussed above with regard to GM and Ford model cars, it is to be understood that EDR data may be obtained from, and the methods and system of the present invention may be used with, any make or model vehicle having EDR technology.

In certain cases, when external factors are linked to the harvested data, insight into accident causation can be gleaned. For example, if the data shown in FIG. 1 was collected from an intersection collision, the information might be suggestive of a driver attempting to accelerate through an intersection before the traffic light turned red and deciding at the last moment to abort the attempt but failing to stop the vehicle prior to the collision. This scenario can be inferred because the "black box" data shows that the vehicle was in fact accelerating approximately four seconds prior to the collision and that braking did not occur until approximately three seconds prior to the collision.

Clearly, EDR information provides objective and definitive information regarding time, speed and distance factors as they relate to the cause of an accident. Such information is critical to accurate liability determinations.

After harvesting, "black box" data may be used in analysis of a vehicle collision. In an example embodiment, the data may be imported into a computer-based vehicle collision analysis system to provide greater insight into not only what happened to the vehicle from which the black box data was harvested, but also provide insight into what happened to the other vehicle and its occupants.

In one embodiment after the data is harvested, it can be transmitted electronically from the retrieval system to a central location. For example, a retrieval tool may include a personal computer, such as a laptop PC, which may be connected to transmit the data via any number of well-known means, including wireless transmission, telephone line, cable or DSL modem, ISDN lines, or other data transmission routes. However, it is to be understood that in certain embodiments, the retrieval system need not be connected to such a personal computer. Further, in an example embodiment, the central location may be an office of an insurance company, an injury analysis firm, or the like. Such a central location may include various computer systems, including personal computers, servers, data storage devices, and the like.

The system of the present invention may be used by a user who is not technically proficient in accident reconstruction techniques. That is, the methods and system disclosed herein may be implemented by a non-technical user to analyze vehicle accidents. In this way, entities using the system and methods, such as insurance companies and the like, can task non-technical, and thus lower cost, workers with analyzing vehicle accidents. Such analysis may include comparing accident claims (both personal and property injury) to an actual accident to determine whether the claims are consistent with likely damage and/or injury.

In example embodiments, the data may be transmitted from a data retrieval tool to the central location via the Internet. In certain embodiments, it may be desirable to transmit the data in a secure manner to preserve the sanctity and reliability of the data. Alternately, data collected from a retrieval tool may be stored on any number of well-known storage media including floppy discs, ZIP discs, CD ROM's, CD-RWs, disc drives, tape means, and the like. In such manner, the data can later be downloaded to a computer at another location.

With respect to a computer system at a central location, in one embodiment, the data may be transmitted and stored in a server or a data storage device associated with such a server. Alternately, the data may be transmitted to a personal computer unassociated with such a network. After receipt of such data, the central location may use the data alone or in connection with other computer-based vehicular analysis tools. In an example embodiment, the data obtained from the EDR may be used in connection with a computer-based system to aid in analysis of a vehicle accident. The data may be used to determine change in velocity of one or more vehicles involved in the accident, impact severity of the accident, the principal direction of force acting on the vehicles, and other parameters associated with such an accident, including, for example, pre-impact vehicle speeds, and sequence of impacts in a multi-vehicle impact.

Such a computer-based system is a complementary technology to EDR systems since EDR technology cannot derive point and angle of impact (i.e., impact configuration), nor can it independently assess accident implications to the other vehicle and its occupants. For these reasons, "black box" data is an important supplemental source of information in the investigation of a claim. Traditional sources of information used to evaluate claims such as collision repair estimates and vehicle photographs will continue to be important to any analysis of what happened in a collision.

In certain embodiments, the methods described herein may be used in connection with the system and methods described in U.S. Pat. No. 6,381,561, the disclosure of which is hereby incorporated by reference. Similarly, the methods described herein may be used in connection with the system and methods described in U.S. Pat. No. 6,470,303, the disclosure of which is hereby incorporated by reference. Further, the system and methods described herein may be used in connection with the vehicle accident analysis system entitled WREXPERT, commercially available from the assignee hereof, future versions of the WREXPERT system, and other such systems, commercially available or otherwise.

An example embodiment of a computer-based system in accordance with the above-referenced disclosures, namely the WREXPERT system, contains databases with information on over 28,000 private passenger autos, pickups, vans and SUVs. These specifications include physical dimensions, mass attributes, and crash test data/performance. With this information and a vehicle's collision repair estimates and damage photographs, the computer-based system can determine impact severity to both vehicles involved in the collision, injury potential to each vehicle's occupants as well as highlight accident causation issues (point of impact, angle of impact, etc.). This analysis process facilitates a liability determination based on the objective data documented in the repair process and recorded by the vehicle during the accident event. Consequently, time related to attempting to reconcile disparate statements among witnesses and accident participants can be minimized. The analysis process can also help facilitate a science-based estimation of impact severity, occupant motion and subsequent injury potential of a vehicle collision.

The system and methods disclosed herein may also be used to identify data inconsistencies that may be captured by an EDR system, such as inaccurate pre-crash speeds related to skidding or other scenarios involving a loss of traction. Since such a computer-based system may employ numerous analysis methodologies and its algorithms must always satisfy the laws of physics, data inconsistencies can be quickly identified. For example, comparison of traditional impact severity techniques (as described in U.S. Pat. No. 6,381,561) and accident descriptions can illuminate inconsistencies between the damages to the vehicle and the resulting impact severity and the EDR data. In certain embodiments, the EDR data can be weighted more (or less) heavily than traditional impact severity techniques to more accurately measure impact severity.

In an example embodiment, a computer system, such as a PC, includes a processor coupled to system memory via a bus. The bus may, for example, include a processor bus, local bus, and an extended bus. A nonvolatile memory, which may, for example, be a hard disk, read only memory ("ROM"), floppy magnetic disk, magnetic tape, compact disk ROM, other read/write memory, and/or optical memory, stores machine readable information for execution by the processor. Generally, the machine readable information is transferred to system memory via the bus in preparation for transfer to processor in a well-known manner. The computer system may also include an I/O ("input/output") controller which provides an interface between the bus and I/O device(s). In a well-known manner, information received by an I/O controller from I/O device(s) is generally placed on a bus and in some cases stored in nonvolatile memory and in some cases is utilized directly by the processor or an application executing on the processor from system memory. I/O device(s) may include, for example, a keyboard, a mouse, and a modem. A modem may transfer information via electronic data signals between the I/O controller and an information source such as another computer which is coupled to the modem via, for example, a conductive media or electromagnetic energy.

The computer system may also include a graphics controller which allows it to display information, such as a windows based graphical user interface, on display in a well-known manner. It will be understood by persons of ordinary skill in the art that computer system may include other well-known components. Further, similar components may be present in devices other than a PC, such as a PDA, pen-based device, advanced cellular phones, and the like, all of which may be referred to as a computer. Further, similar components may be present in server and data storage devices, which may be interconnected as a computer system.

Is important to note that EDR information is harvestable even when the air bag does not deploy in a collision. For example, in GM systems when the airbag system is "awakened" during a collision but the system determines that the collision is not severe enough to warrant air bag deployment, the event is referred to as a "near deployment event" In near deployment events, the data recorded and saved is temporarily stored for 250 ignition cycle counts (or approximately forty five days of normal use). Should a vehicle be involved in another near deployment event before a previous near deployment event is cleared, the most severe event is stored for most EDR's. Should the subsequent collision be severe enough to warrant the deployment of an airbag (a deployment event), the data is permanently stored. Alternately, the EDR can store both types of events simultaneously, with separate storage areas for near deployment and deployment data. This technology may also record two or more impacts in an accident sequence if at least one of the impacts is severe enough to deploy the airbag.

Typically, EDR information may be valuable to more than high severity, high monetary value cases. It is harvestable in the frequent, minor-type collisions and is very helpful in resolving "low impact" type claims. Since this data is time-sensitive, early recognition of harvesting opportunities will be critical in the claims process. Also, should a question arise concerning whether the data harvested is applicable to the accident in question because of a claim of a subsequent collision, the data storage strategies insure that the worst-case event is being evaluated. In injury claims, this gives the claimant every benefit of the doubt. Further, when an airbag deploys in an accident, the module storing data must be replaced. These modules should be identified and treated as relevant evidence in the investigation and evaluation of an accident. Accordingly, process revisions as to the salvage and storage of these parts in the collision repair process are warranted.

Data retrieval from an EDR is a very straightforward process and may be accomplished in 5 to 10 minutes if the vehicle is not structurally compromised in a fashion that makes the harvesting portals inaccessible. As shown in FIG. 2, in an exemplary embodiment, a crash data retrieval ("CDR") system includes an interface module 100 which may be connected to a personal computer ("PC") 150 via cable 160 through a serial port of the PC. As discussed above, other forms of computers may be used to obtain the EDR information instead of a laptop PC as shown in FIG. 2. In an example embodiment, the interface module 100 may be a Vetronix Crash Data Retrieval System on which WINDOWS-based Vetronix software is loaded. Once the CDR software is activated on the PC, the CDR system may be connected to one of two available ports on the vehicle via cable 120 extending from the interface module 100. One port is the diagnostic link connector or OBDII port. In most vehicles, this port is found under the dashboard. This port is universal across all manufacturers in the U.S. and data may be harvested from this port using a standard cable. Should this port be compromised, the data may be harvested directly from the module storing the data (the SDM in GM vehicles) using a cable compatible with the storage module. It is to be understood that various cables may be used to harvest information from different makes and models. Further, in certain embodiments, such cabling may be unnecessary, as data may be retrieved using wireless technology in certain embodiments.

Once the cable connections are made, a harvesting session may begin. In an example embodiment, the harvester of the information enters their name, the case or claim number, the date the information was harvested, the date of the accident and the VIN. Once this data is entered, the harvesting process may be activated from the PC and the data is downloaded to the PC and its designated storage medium. For ease of identification, the filename of the downloaded information may be the VIN.

It is to be understood that to harvest information from a EDR system, the vehicle need not have power. In these cases, the CDR system can be powered from another vehicle using a cigarette lighter adapter or from traditional power outlets in a repair shop environment. Further, the harvesting of "black box" data by a CDR system does not erase the information in the data storage module. In other words, the same "black box" information related to an accident event can be harvested multiple times by parties with different interests. In this regard, the data collected is objective and favors no party or, in other words, "the knife cuts both ways". Since the data is objective and has well documented rates of accuracy, it can eliminate costly debates over various aspects of an accident event.

Potential harvesters of "black box' data include, for example, researchers, forensic experts and investigators, law enforcement personnel, attorneys, government agencies, insurance company personnel, independent adjusters/appraisers, auto repair facility personnel and airbag service and installation companies.

For the insurance industry, a tremendous opportunity exists to leverage existing inspections of vehicles during the collision repair process and harvest EDR information during the same time the vehicle is photographed and a repair estimate is written. If accomplished during these processes, the information becomes available early in the evaluation of a claim.

Once "black box" data is harvested, the data may then be analyzed. In those circumstances where the harvester of the information will also be analyzing the data, no data transmission is required. In these situations, chain of custody issues related to the data, if any, are minimal. Only data and harvesting integrity can be questioned. Because expert harvesting and analysis is cost prohibitive on a large-scale basis, the present invention provides an alternative.

In an example embodiment, a secure web site may be provided to which harvested "black box" data can be uploaded and maintained without exposure to corruption or subsequent alteration. The unique features of this web site include: 1) transmission of original hexadecimal data retrieved from the EDR system to prevent the possibility of data tampering; 2) administrative data capture to document chain of custody; and 3) accessibility of the data in an unalterable form by only authorized personnel. Further, the data may be transferred in encrypted form as a further security measure. In an example embodiment, the website may be resident on a server or other computer. Using the previously described computer-based system and aforementioned web site, "black box" data can be harvested in Florida, uploaded and subsequently analyzed in California in the same business day for example.

In conjunction with other technologies, the following factors related to injury causation can be assessed with EDR information: impact severity; restraint system utilization; injury mechanisms; and injury severity.

Additionally, the following factors relevant to an accident causation and liability determination analysis can be assessed with the use of other technologies: point of impact; angle of impact; pre-impact speeds; pre-impact braking times and distances; human factors, restraint system utilization, and determining impact sequence.

Some EDR's record the severity of a crash event by calculating the longitudinal Delta-V. The Delta-V is calculated by integrating the accelerometer data. Internally, the SDM calculates the Delta-V every 1.25 milliseconds, but records the data at 10 milliseconds intervals.

Some EDR's record pre-crash data in addition to the crash severity. The pre-crash data consists of the vehicle's speed, engine speed, percent throttle, and brake switch circuit status. Each of these parameters is sampled at 1-second intervals and stored in a buffer containing 5 samples. Upon algorithm enable (AE), this buffer is recorded in the EDR. Algorithm enable is the time at which the EDR "wakes up" and decides there is an event worthy of its attention.

There are 3 different types of EDR's used in late model GM vehicles (1996 and newer) which record pre-impact speed, longitudinal Delta-V, or both. Although the example used is with reference to GM models, it is to be understood that these EDR's may be placed on vehicles of any make or model. These types are summarized in Table 1. A simple impact model may be used in conjunction with data from each type of EDR to assess the collision severity for both vehicles.

TABLE 1

| Type | Longitudinal Delta-V | Pre-impact Speed |
|---|---|---|
| 1 | ✓ | ✓ |
| 2 |   | ✓ |
| 3 | ✓ |   |

An algorithm in accordance with the present invention uses a simple planar impact model based on conservation of momentum principles. In an example embodiment, the model may be subject to the following simplifications. First, vehicles are constrained to motion in the plane, i.e. longitudinal translation, lateral translation, and rotation. Second, only collision forces are considered significant. Tire friction forces are neglected. This has the effect of overestimating impact severity in most cases. Third, instantaneous transfer of momentum that is the impulse acting on each vehicle has an infinitesimally small duration. This impulse represents the resultant collision impulse and acts at a single point on each vehicle. This point is referred to as the center of impulse. Fourth, relative motion between the vehicles' impulse centers is constrained by coefficients of restitution and slip. Fifth, colliding bodies are modeled as rigid, with constant mass and inertial properties.

Figure 3:
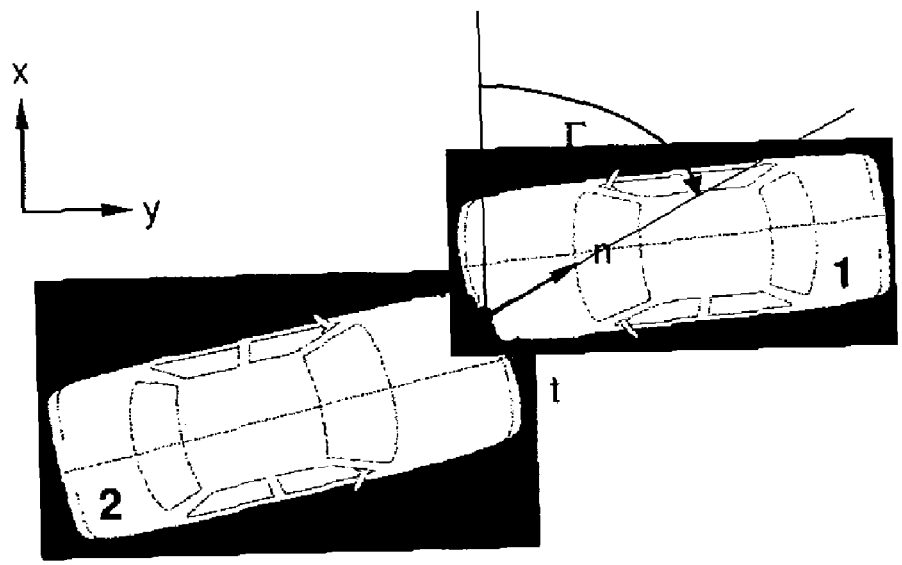
FIG. 3 is a block diagram of an impact configuration with a defined collision plane of a first and second vehicle.
Figure 4:
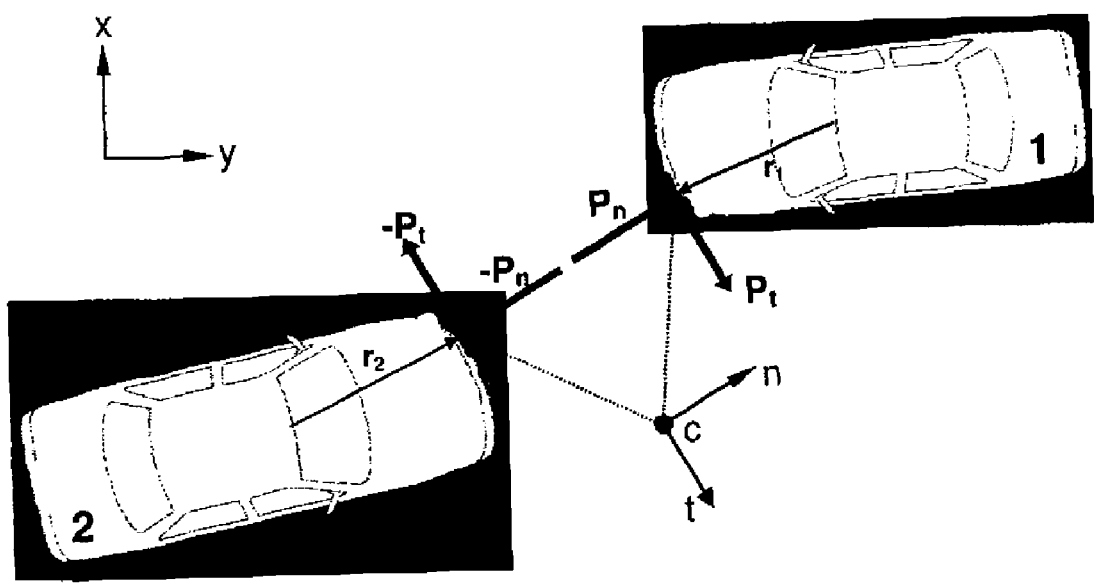
FIG. 4 is a block diagram of vehicle and collision geometry of a collision between a first vehicle and a second vehicle.

Table 2 summarizes the nomenclature used in the derivation of the impact model. FIGS. 3 and 4 illustrate the vehicle geometry and coordinate systems used throughout the derivation.

TABLE 2

| Symbol | Meaning |
|---|---|
| V | Velocity vector |
| ω | Angular velocity vector |
| θ | Heading angle |
| R | Position vector |
| φ | Angle to impulse center relative to heading |
| P | Impulse vector |
| M | Mass |
| $I_z$ | Moment of inertia |
| ε | Coefficient of restitution |
| Γ | Angle to collision plane with respect to fixed Earth reference |
| σ | Coefficient of slip |

| Subscripts/Superscripts | Meaning |
|---|---|
| 1, 2 | Vehicle number |
| C | Center of impulse |
| n, t | Normal/tangential coordinates |
| x, y | Fixed Earth coordinates |

TABLE 2-continued

| | |
|---|---|
| R | Relative (e.g. relative velocity) |
| •(dot) | Rate (e.g. yaw rate) |
| '(prime) | Post impact (e.g. post-impact velocity) |

The velocity of the impulse center, C, for each vehicle is given by $$\vec{V}_{c1} = \vec{V}_1 + \vec{\omega}_1 \times \vec{r}_1 \quad (1)$$

$$V_{c1n} = V_{1n} - \dot{\theta}_1 r_{1t} \quad (1a)$$

$$V_{c1t} = V_{1t} + \dot{\theta}_1 r_{1n} \quad (1b)$$

$$\vec{V}_{c2} = \vec{V}_2 + \vec{\omega}_2 \times \vec{r}_2 \quad (2)$$

$$V_{c2n} = V_{2n} - \dot{\theta}_2 r_{2t} \quad (2a)$$

$$V_{c2t} = V_{2t} + \dot{\theta}_2 r_{2n} \quad (2b)$$

The relative velocity of the impulse centers prior to the collision is given by $$\vec{V}_{rc} = \vec{V}_{c1} - \vec{V}_{c2} = \vec{V}_1 + \vec{\omega}_1 \times \vec{r}_1 - (\vec{V}_2 + \vec{\omega}_2 \times \vec{r}_2) \quad (3)$$

During the collision, the relative velocity of the impulse centers is changed by $$\Delta \vec{V}_{rc} = (\vec{V}_{rc}' - \vec{V}_{rc}) = (\vec{V}_{c1}' - \vec{V}_{c2}') - (\vec{V}_{c1} - \vec{V}_{c2}) = (\vec{V}_{c1}' - \vec{V}_{c1}) - (\vec{V}_{c2}' - \vec{V}_{c2}) \quad (4)$$

$$\Delta \vec{V}_{rc} = [\vec{V}_1' + \vec{\omega}_1' \times \vec{r}_1 - (\vec{V}_1 + \vec{\omega}_1 \times \vec{r}_1)] - [\vec{V}_2' + \vec{\omega}_2' \times \vec{r}_2 - (\vec{V}_2 + \vec{\omega}_2 \times \vec{r}_2)] \quad (4a)$$

The relative velocity of the impulse centers after the collision is given by $$\vec{V}_{rc}' = \vec{V}_{rc} + \Delta \vec{V}_{rc} \quad (5)$$

$$V_{rc_n}' = V_{rc_n} + [(V_{1n}' - V_{1n}) - (\dot{\theta}_1' - \dot{\theta}_1) r_{1t}] - [(V_{2n}' - V_{2n}) - (\dot{\theta}_2' - \dot{\theta}_2) r_{2t}] \quad (5a)$$

$$V_{rc_t}' = V_{rc_t} + [(V_{1t}' - V_{1t}) + (\dot{\theta}_1' - \dot{\theta}_1) r_{1n}] - [(V_{2t}' - V_{2t}) + (\dot{\theta}_2' - \dot{\theta}_2) r_{2n}] \quad (5b)$$

The impulse-momentum equations for the two vehicles $$\vec{P} = m_1(\vec{V}_1' - \vec{V}_1) \quad -\vec{P} = m_2(\vec{V}_2' - \vec{V}_2) \quad (6)$$

$$P_n = m_1(V_{1n}' - V_{1n}) \quad -P_n = m_2(V_{2n}' - V_{2n}) \quad (6a)$$

$$P_t = m_1(V_{1t}' - V_{1t}) \quad -P_t = m_2(V_{2t}' - V_{2t}) \quad (6b)$$

$$\vec{r}_1 \times \vec{P} = I_{z1}(\vec{\omega}_1' - \vec{\omega}_1) \quad \vec{r}_2 \times -\vec{P} = I_{z2}(\vec{\omega}_2' - \vec{\omega}_2) \quad (7)$$

$$r_{1n} P_t - r_{1t} P_n = I_{z1}(\dot{\theta}_1' - \dot{\theta}_1) \quad -r_{2n} P_t + r_{2t} P_n = I_{z2}(\dot{\theta}_2' - \dot{\theta}_2) \quad (7a)$$

Combining equations 5, 6, and 7 gives $$V_{rc_n}' = V_{rc_n} + \frac{P_n}{m_1} - \left(\frac{r_{1t} r_{1n} P_t}{I_{z1}} - \frac{r_{1t}^2 P_n}{I_{z1}}\right) - \left[\frac{-P_n}{m_2} - \left(\frac{-r_{2t} r_{2n} P_t}{I_{z2}} + \frac{r_{2t}^2 P_n}{I_{z2}}\right)\right] \quad (8)$$

$$V_{rc_n}' = V_{rc_n} + P_n\left(\frac{1}{m_1} + \frac{1}{m_2} + \frac{r_{1t}^2}{I_{z1}} + \frac{r_{2t}^2}{I_{z2}}\right) - P_t\left(\frac{r_{1t} r_{1n}}{I_{z1}} + \frac{r_{2t} r_{2n}}{I_{z2}}\right) \quad (8a)$$

-continued $$V'_{rc_t} = V_{rc_t} + \frac{P_t}{m_1} + \frac{r_{1n}^2 P_t}{I_{z1}} - \frac{r_{1n}r_{1t}P_n}{I_{z1}} - \left[\frac{-P_t}{m_2} - \frac{r_{2n}^2 P_t}{I_{z2}} + \frac{r_{2n}r_{2t}P_n}{I_{z2}}\right] \quad (9)$$

$$V'_{rc_t} = V_{rc_t} - P_n\left(\frac{r_{1n}r_{1t}}{I_{z1}} + \frac{r_{2n}r_{2t}}{I_{z2}}\right) + P_t\left(\frac{1}{m_1} + \frac{1}{m_2} + \frac{r_{1n}^2}{I_{z1}} + \frac{r_{2n}^2}{I_{z2}}\right) \quad (9a)$$

Equations 8 and 9 can be rewritten as $$V_{rc_n}' = V_{rc_n} + c_2 P_n - c_3 P_t \quad (10)$$

$$V_{rc_t}' = V_{rc_t} - c_3 P_n + c_1 P_t \quad (11)$$

where, $$c_1 = \frac{1}{m_1} + \frac{1}{m_2} + \frac{r_{1n}^2}{I_{z1}} + \frac{r_{2n}^2}{I_{z2}} \quad (12)$$

$$c_2 = \frac{1}{m_1} + \frac{1}{m_2} + \frac{r_{1t}^2}{I_{z1}} + \frac{r_{2t}^2}{I_{z2}} \quad (13)$$

$$c_3 = \frac{r_{1t}r_{1n}}{I_{z1}} + \frac{r_{2t}r_{2n}}{I_{z2}} \quad (14)$$

Coefficients of restitution and slip are introduced to relate the post-impact relative velocity of the impulse centers to their pre-impact relative velocity.

The coefficient of restitution is the ratio of the post-impact relative velocity to the pre-impact relative velocity in the direction normal to the collision plane, i.e., $$\varepsilon = \frac{-V'_{rc_n}}{V_{rc_n}} \quad \varepsilon \subseteq [0,1] \quad (15)$$

The slip coefficient is the ratio of the post-impact to pre-impact relative velocity along the tangential direction, i.e., $$\sigma = \frac{V'_{rc_t}}{V_{rc_t}} \quad \sigma \subseteq [-1,0] \quad (16)$$

The equations 10, 11, 15, and 16 can be solved using Cramer's rule, i.e., $$P_n = \frac{V_{rc_n}(1+\varepsilon)c_1 + V_{rc_t}(1-\sigma)c_3}{c_3^2 - c_1 c_2} \quad (17)$$

$$P_t = \frac{V_{rc_n}(1-\sigma)c_3 + V_{rc_t}(1+\varepsilon)c_2}{c_3^2 - c_1 c_2} \quad (18)$$

The impulses (given by 17 and 18) can be substituted in the impulse-momentum equations directly to solve for the post-impact velocities.

Figure 5:
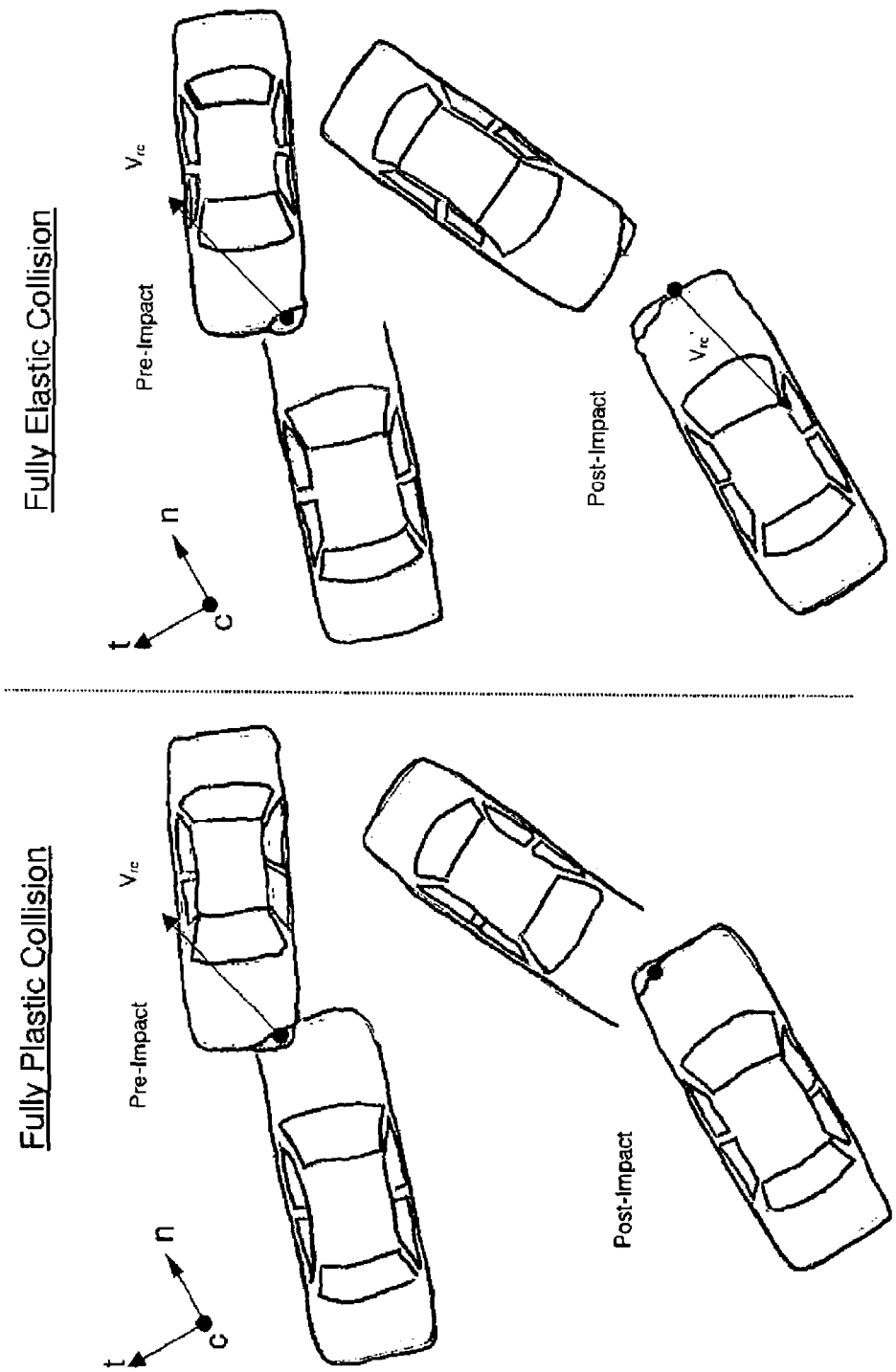
FIG. 5 is a block diagram illustrating the difference between a plastic collision and an elastic collision.

These equations (17 and 18) show that the impulse vector (and hence $\Delta V$) is a function of the closing velocity, vehicle mass properties, vehicle configuration ($r_n$, $r_t$ in constants c1, c2, c3), and restitution/slip coefficients ($\varepsilon, \sigma$). When the restitution/slip coefficients are both equal to zero, there is no relative velocity between the collision centers post-impact. In other words, the vehicles' collision centers act like a pin joint, connecting two bodies in planar motion, which can still have relative rotational velocity. This type of collision is referred to as a fully plastic collision. A fully elastic collision occurs when the restitution/slip coefficients take on their maximum absolute values, 1 and −1, respectively. In a fully elastic collision, the component of the relative velocity normal to the collision plane changes sign from pre-impact to post-impact. The relative velocity tangential component remains constant. The fully plastic collision and fully elastic collision are depicted in FIG. 5. Differences in vehicle position and heading from pre-impact to post-impact are shown for illustrative purposes only. This model assumes an instantaneous transfer of momentum in which the vehicles' position and heading remain fixed.

The coefficients of restitution and slip are not required to have the same absolute values. However, when they do, i.e., when $\sigma = -\varepsilon$, equations 17 and 18 can be written as $$P_n = \left[\frac{V_{rc_n}c_1 + V_{rc_t}c_3}{c_3^2 - c_1 c_2}\right](1+\varepsilon) \quad (19)$$

$$P_t = \left[\frac{V_{rc_n}c_3 + V_{rc_t}c_2}{c_3^2 - c_1 c_2}\right](1+\varepsilon) \quad (20)$$

Figure 6:
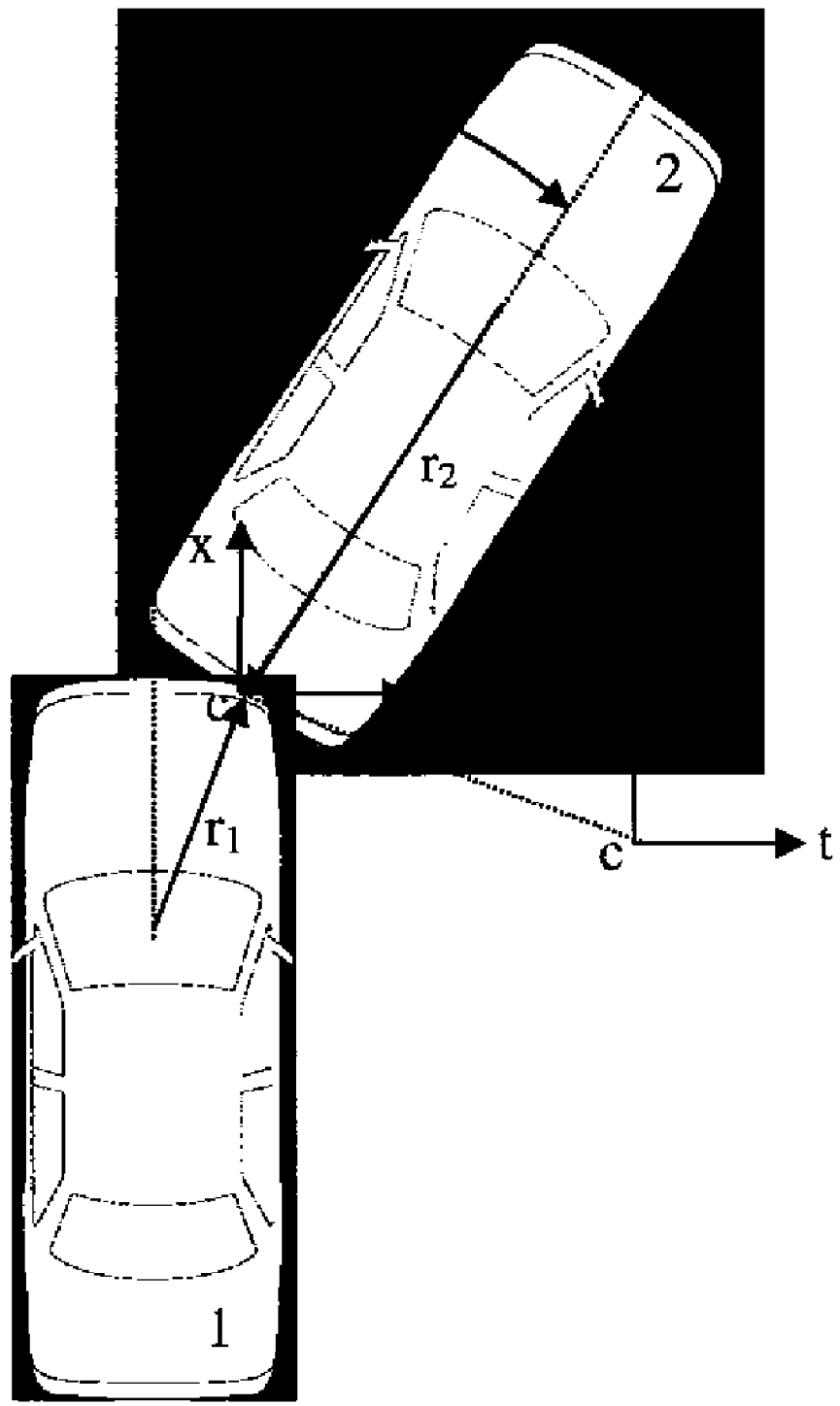
FIG. 6 is a block diagram of a center of impact, C, of a collision of a first vehicle and a second vehicle.

Using equations 19 and 20 simplify the model because they are independent of the collision plane angle, $\Gamma$. Notice that equations 19 and 20 are just the equations for the fully plastic impact multiplied by the scalar $(1+\varepsilon)$. Since these equations are not dependent on the angle $\Gamma$, this angle can be chosen for convenience. For example, FIG. 6 shows a two-vehicle collision configuration in which the fixed-Earth reference frame and collision reference frame are chosen such that they have the same orientation as the reference frame of vehicle #1. This convention will be used for the impact algorithm employing "black box" data.

The next sections describe the various EDR's and how the information extracted therefrom may be used in conjunction with the model to assess impact severity, and, in some cases, to predict the pre-impact velocity of the "struck" vehicle.

A type 1 EDR records the vehicle's pre-impact speed and longitudinal $\Delta V$. It is assumed that the vehicle with the EDR (striking vehicle) is headed in the same direction as the x-axis of a fixed earth non-inertial reference frame (see FIG. 6). It is further assumed that this direction is parallel with the n-axis of the n-t reference frame. Two additional assumptions are required for the solution: (1) neither vehicle has any pre-impact rotational velocity, $\omega_1 = \omega_2 = 0$; and (2) neither vehicle has any pre-impact sideslip velocity, $V_{y1} = V_{y2} = 0$.

Based on these assumptions equations 19 and 20 become $$P_n = \left[\frac{(V_{1x} - V_{2x}\cos\theta_2)c_1 - V_{2x}\sin\theta_2 c_3}{c_3^2 - c_1 c_2}\right](1+\varepsilon) \quad (21)$$

$$P_t = \left[\frac{(V_{1x} - V_{2x}\cos\theta_2)c_3 - V_{2x}\sin\theta_2 c_2}{c_3^2 - c_1 c_2}\right](1+\varepsilon) \quad (22)$$

The terms $\cos\theta_2$ and $\sin\theta_2$ are from the conversion from the fixed-vehicle reference frame of vehicle #2 to the n-t reference frame. From equation 6a, equation 21 can be rewritten as $$m_1 \Delta V_{1x} = \left[\frac{(V_{1x} - V_{2x}\cos\theta_2)c_1 - V_{2x}\sin\theta_2 c_3}{c_3^2 - c_1 c_2}\right](1+\varepsilon) \quad (23)$$

which can be solved directly for $V_{2x}$, i.e., $$V_{2x} = \frac{\left[V_{1x}c_1 - \frac{m_1 \Delta V_{1x}(c_3^2 - c_1 c_2)}{(1+\varepsilon)}\right]}{\cos\theta_2 c_1 - \sin\theta_2 c_3} \quad (24)$$

This value can then be substituted into equation 22 to solve for the tangential component of the resultant impulse vector (and $\Delta V_{2y}$).

Further, the principal direction of force (PDOF) can be determined. The determination of PDOF may be done in connection with information obtained from the user. Such user input information may include damage information, which in an example embodiment may include damage pattern information regarding which components needed repair or replace, crush depth of certain components, points of contact, or the like. Further, user input information may include a description of the accident. Such description may include pre-accident vehicle motion, direction of travel for the vehicles, turning patterns, and the like. Based on this information, the point of impact on the vehicles and the PDOF may be determined.

After determination of the points of impact and PDOF of the vehicles, impact severity may be determined. In an accident in which one vehicle has an EDR, the impact severity of the other vehicle may be determined using the EDR data of the first vehicle and the points of impact and PDOF previously determined for the vehicles. Specifically, the Delta-V of the first vehicle may be obtained from the EDR and used in the above equation 24 to determine pre-impact speed of the second vehicle, which may then be used in equation 22 above to determine the impact severity of the second vehicle.

In certain embodiments, the Delta-V obtained from the EDR may be adjusted to correct for any underestimation inherent in the EDR, as discussed below. Further, to more accurately determine impact severity, the adjusted Delta-V (which in certain embodiments may include a high and a low range), may be input into a Monte Carlo simulation module, also discussed more fully below.

Based on the information determined by the system based on the EDR data (and in combination with other data), impact severity can thus be determined. In addition to Delta-V, the principal direction of force upon the vehicles can be determined based on the black box data and the vehicle damage. From this information, injury potential can also be evaluated. That is, given a particular value for Delta-V and principal direction of force, a range of potential injury can be determined. Such a determination may be made by use of rule-based logic, in which the values of Delta-V and PDOF can be compared, along with information as to whether the occupant was properly restrained. Based on the results of such injury potential, an insurance company or other interested party can then analyze whether a claimant's injury claim is consistent with that determined by the system. Further, an analysis of the point and angle of impact can be used to resolve issues relating to which vehicle had the right of way, which may be relevant to fault analysis and/or contributory negligence. Similarly, an analysis of the pre-impact speed of the vehicle having the EDR (and/or the other vehicle) to the speed limit for the location of the accident may indicate that one or both of the vehicles were exceeding the speed limit.

If a Type 1 black box is used, i.e., it has both pre-impact speed and Delta-V information, the pre-impact speed calculated for the "struck" vehicle should agree with the user's description of the accident scenario. This description may be input into the system by a user from information derived from an accident report or the like. For example, the user may indicate that the "struck" vehicle was stopped prior to impact. In contrast, the black box information and the laws of physics may suggest that the vehicle was moving prior to impact. Another example is that the user indicates that the "struck" vehicle is moving forward prior to impact and the black box analysis indicates the "struck" vehicle was backing up prior to impact. In such instances, discrepancies may be resolved in part by resort to the methods shown in FIGS. 9A and B and 14-17, discussed below. Alternately, a user may be provided with a prompt, such as a graphical user interface, in order to choose to ignore EDR data in the analysis of a given accident.

A type 2 EDR records pre-impact speed only. To assess impact severity using information from this type of EDR, the struck vehicle must be at rest prior to impact (or its velocity must be known or reasonably bounded). If the struck vehicle is at rest, then the pre-impact speed measured by the EDR is a good measure of the closing speed. Equations 19 and 20 can be used to solve for the $\Delta V$ of both vehicles.

A type 3 EDR records longitudinal $\Delta V$ only. To assess impact severity using information from this type of EDR, the struck vehicle must be at rest prior to impact (or its velocity must be known or reasonably bounded). Using the measured $\Delta V$ from the EDR records, the normal component of the impulse vector can be calculated using equation 6a. Assuming the striking vehicle has no pre-impact sideslip velocity, equation 19 can be used to solve for the normal component of the relative velocity, i.e., $$V_{rc_n} = \frac{P_n(c_3^2 - c_1 c_2)}{c_1(1+\varepsilon)} \quad (25)$$

This value can then be substituted into equation 20 to solve for the tangential component of the crash impulse, i.e.

$$P_t = \left[\frac{V_{rc_n} c_3}{c_3^2 - c_1 c_2}\right](1+\varepsilon) \quad (26)$$

Figure 8A:
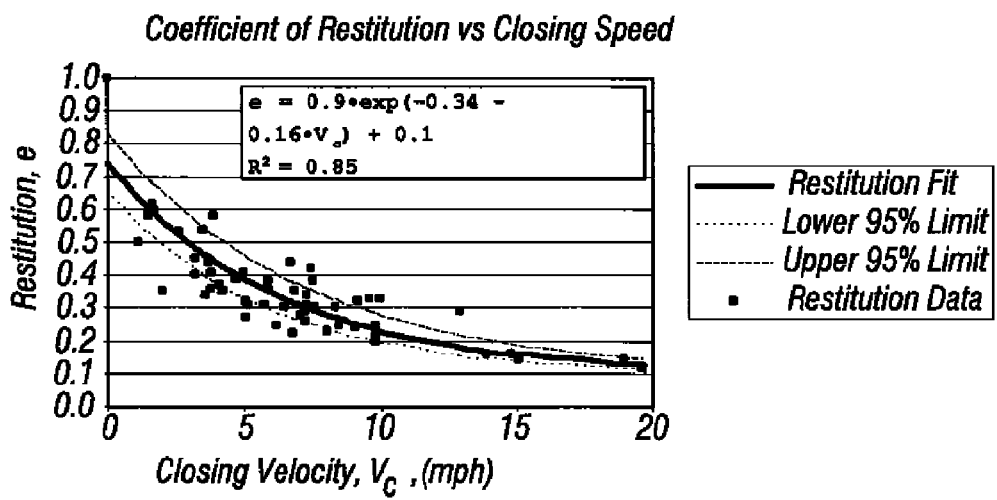
FIG. 8A is a graphical representation of a coefficient of restitution model in accordance with the present invention.

The coefficient of restitution may be based on the following model, which was fit from experimental data $$\varepsilon = 0.1 + 0.9e^{-(0.34+0.16V_c)} \quad (27)$$

where, Vc is the closing velocity in mph. The data and best-fit line are shown in FIG. 8A.

In certain embodiments, a Monte Carlo simulation may be used to account for uncertainty in the input variables. Each of the crash parameters measured by the EDR is subject to measurement errors. These errors are based on the accuracy of the instrument, the measurement technique, or both. Table 3 shows the resolution and accuracy of the parameters measured by an example EDR.

TABLE 3

| Parameter | Full Scale | Resolution | Accuracy | How Measured | When Updated |
|---|---|---|---|---|---|
| $\Delta V$ | +−55.9 mph | 0.4 mph | ~±10% | Integrated acceleration | Recorded every 10 msec, calculated every 1.25 msec. |
| Vehicle speed | 158.4 mph | 0.6 mph | ±4% | Magnetic pickup | Vehicle speed changes by >0.1 mph |
| Engine speed | 16383 RPM | 1/4 RPM | ±1 RPM | Magnetic pickup | RPM changes by >32 RPM. |
| Throttle Position | 100% Wide open throttle | 0.4% | ±5% | Rotary potentiometer | Throttle position changes by >5%. |

In the Monte Carlo simulation, each input variable is randomly sampled from a uniform distribution. The bounds of these distributions are based on reasonable limits. In the case of EDR data, the bounds may be based on the accuracy of the parameter listed in Table 3. For example, if a $\Delta V$ of 10 mph is measured, then a uniform distribution of 9 to 11 mph will be used for the simulation. The process of randomly sampling the input distributions and computing $\Delta V$ is repeated in a loop until the desired sample size is achieved, or until the maximum number of loops has been exceeded.

Figure 7:
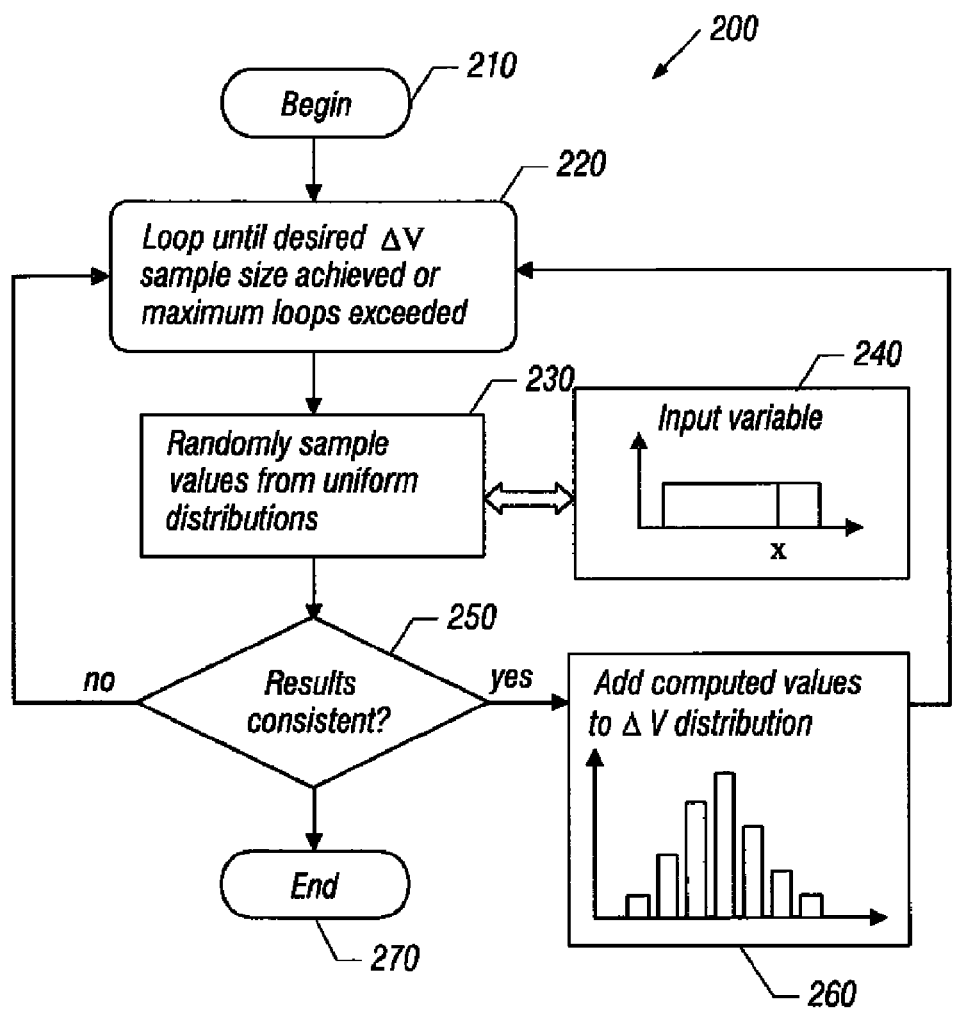
FIG. 7 is a flow chart of a Monte Carlo simulation process according to the present invention.

FIG. 7 is a flow chart of an exemplary Monte Carlo simulation module in accordance with the present invention. As shown in FIG. 7, module 200 includes step 210 in which the Monte Carlo simulation is begun. At step 220, the number of loops of the process is checked against a predetermined maximum number of loops to determine whether the desired sample size has been achieved or whether the maximum number of loops has been exceeded. In an example embodiment, the desired sample size may extend to approximately 10,000 iterations.

If it is determined that the desired sample size has not been achieved nor the maximum number of loops exceeded, control passes to step 230 in which values are randomly sampled from a uniform distribution for the input variable 240. As discussed above, the uniform distribution may be based on reasonable limits dependent upon the accuracy of a given variable. After randomly sampling the value at step 230, control passes to step 250 which determines whether the results are consistent with other evidence. For example, if it is known that the struck vehicle was moving forward at the moment of impact, then all calculations that result in a negative pre-impact speed should be rejected. If it is determined at step 250 that the results are not consistent, control then passes to step 220 in which the number of loops is incremented by one and step 220 is performed again. If it is determined at step 250 that the results are consistent, control passes to step 260 in which the computed value is added to the distribution for the input variable. Then, control passes to step 220. When the maximum number of loops has been exceeded or the sample size has been achieved, control passes from step 220 to step 270 in which the Monte Carlo simulation is concluded. The Monte Carlo results thus provide a range of feasible impact severity answers which satisfy physical laws based on the initial inputs into the system.

Depending on the EDR used, it may be desirable in certain embodiments to make an adjustment to the reported change in velocity value prior to further processing. For example, the EDR found in GM vehicles tends to underestimate the change in velocity ($\Delta V$), as the EDR does not start calculating $\Delta V$ (via integration of an accelerometer signal) until it senses an event that warrants attention. Since the EDR does not enable its algorithm until a threshold event is sensed, it excludes a small part of the acceleration pulse from the integration. Tests have shown that the underestimate is a function of both the pulse shape and duration. To account for this underestimate, the model shown in FIG. 8B was developed.

Figure 8B:
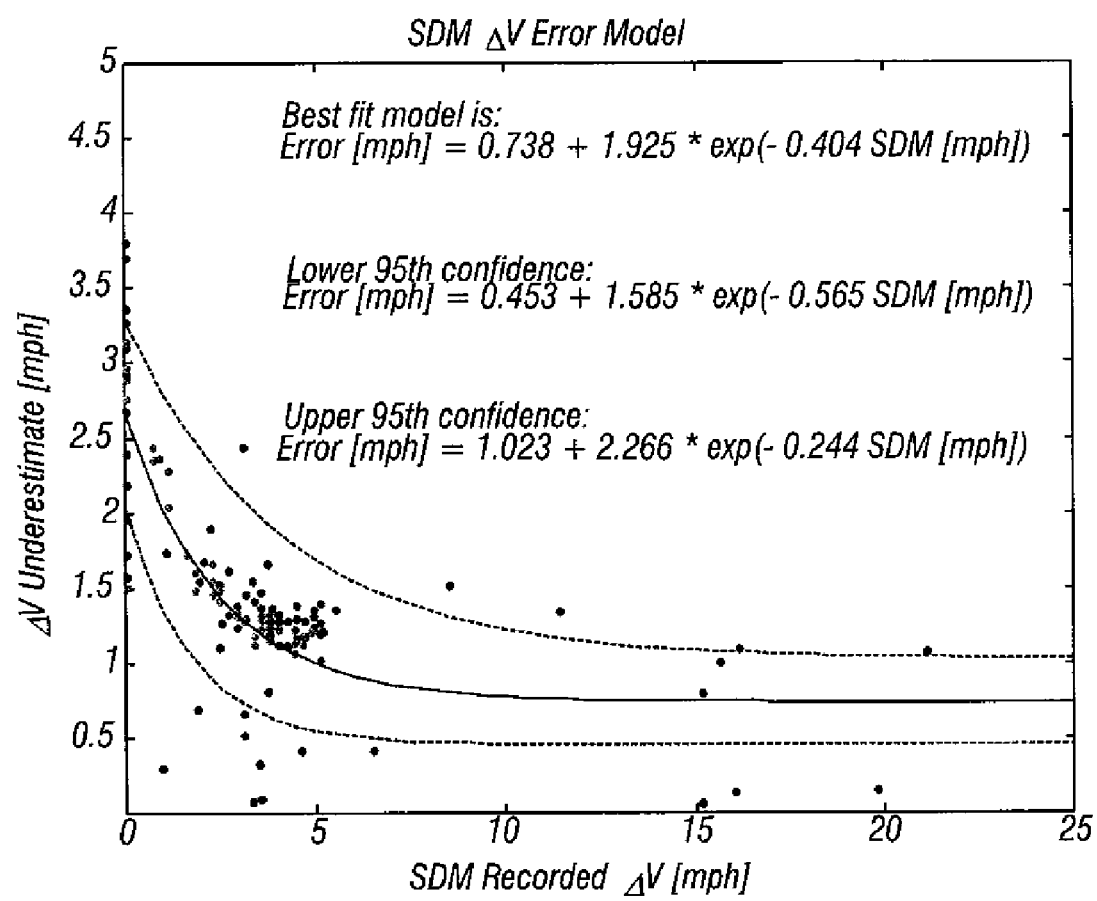
FIG. 8B is a graphical representation of a best fit analysis for underestimation of a change in velocity as calculated by a vehicle EDR.

As shown in FIG. 8B, the raw data points represent the $\Delta V$ measured by the EDR in vehicle-vehicle crash tests and the corresponding $\Delta V$ error (underestimate). To account for this underestimate, the range of $\Delta V$ used in the Monte Carlo simulation as discussed above and shown in FIG. 7 may be adjusted accordingly.

The uniform $\Delta V$ distribution used in the Monte Carlo analysis may thus be defined by lower and upper limits, $\Delta V_{low}$ and $\Delta V_{high}$, respectively. These values may be defined by the value of $\Delta V$ recorded by the EDR, the accuracy of the sensor, and an adjustment made according to the model of FIG. 8B.

In other words, $\Delta V_{low}$ is given by:

$$\Delta V_{low} = \Delta V_{SDM} - 0.10(\Delta V_{SDM}) + \Delta V_{err\_lower95} \qquad (28)$$

and Delta-$V_{high}$ is given by:

$$\Delta V_{high} = \Delta V_{SDM} + 0.10(\Delta V_{SDM}) + \Delta V_{err\_upper95}. \qquad (29)$$

Thus, adjusted values for Delta-V may be used in certain embodiments to more accurately reflect the actual change in velocity.

Figure 9A:
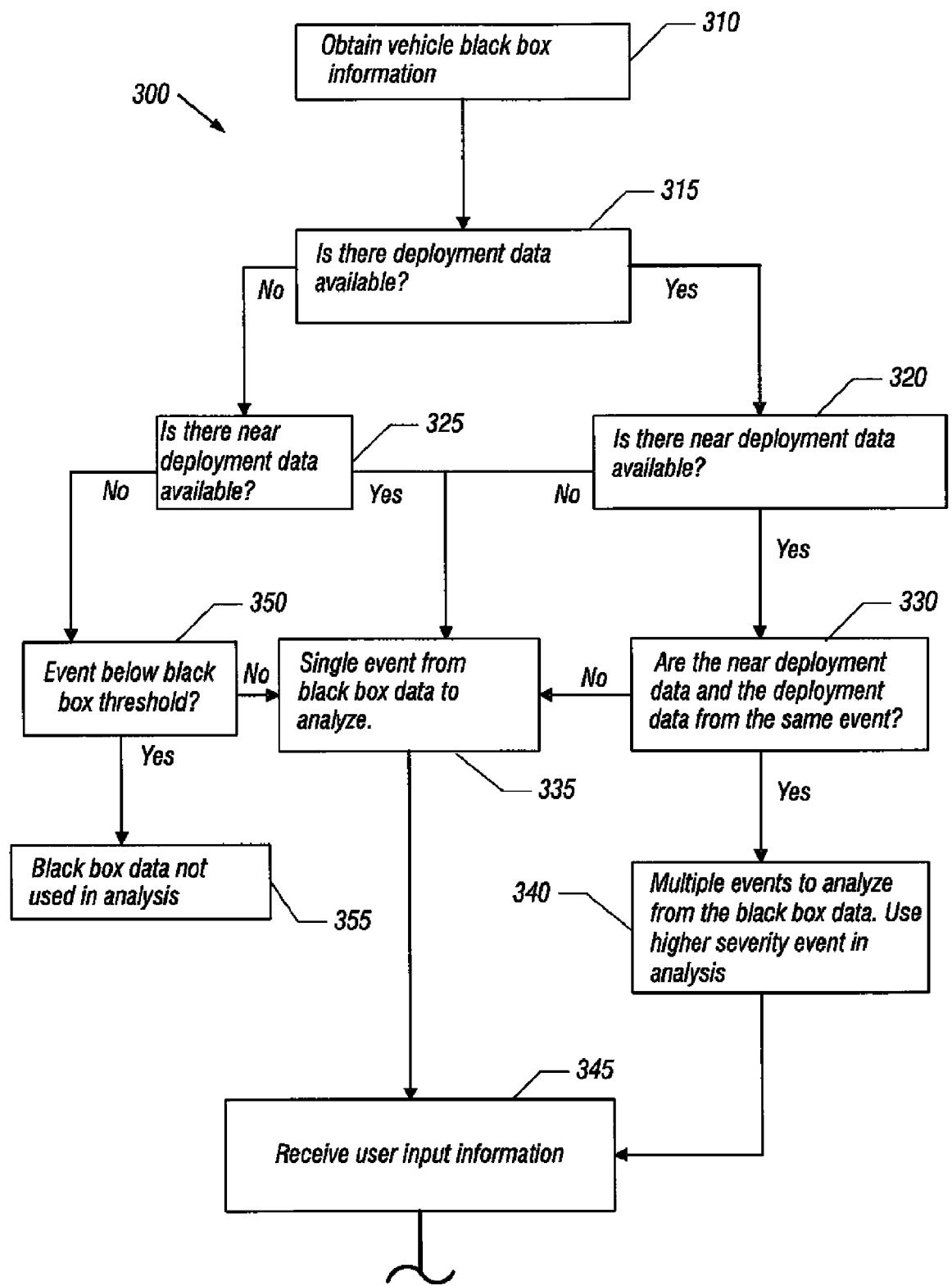
FIGS. 9A and 9B together are a flow chart of an example method in accordance with the present invention.
Figure 9B:
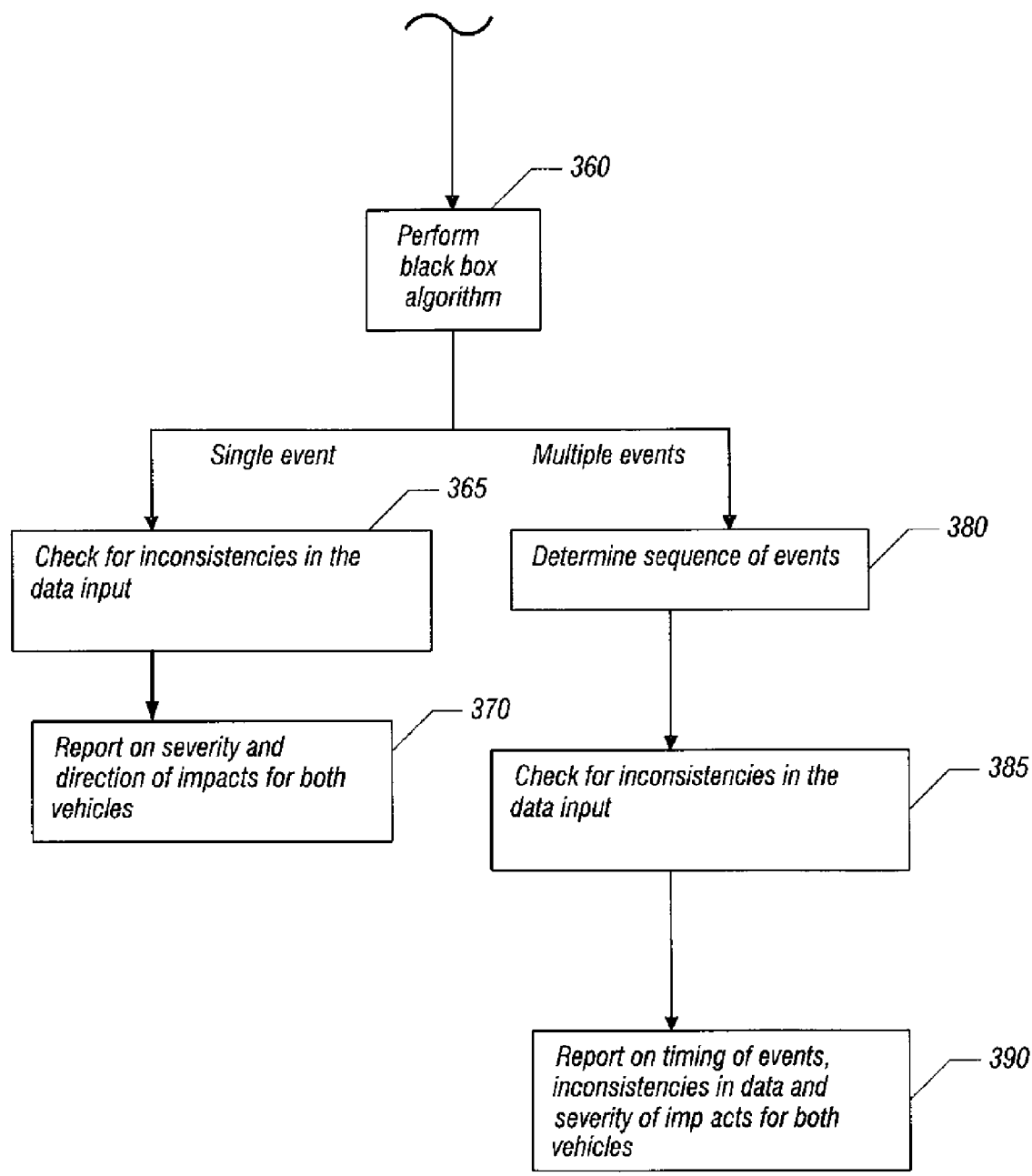

FIGS. 9A and B together are a flow chart of one embodiment of an example module for processing black box data in accordance with the present invention. More specifically, the module of FIGS. 9A and B may be used to determine whether black box information exists for more than one event and process the information accordingly. As shown in FIG. 9A, module 300 operates as follows. At step 310, vehicle black box information is obtained by a computer system which operates software to perform the steps of the method. At step 315, the black box information is checked to determine whether deployment data is available. If such data are available, control passes to step 320, which determines whether near deployment data is available. If such data are present, control passes to step 330, which determines whether the near deployment data and the deployment data are from the same event. Such a determination may be made, for example, by an analysis of ignition cycle counts reported by the EDR in connection with the deployment and near deployment data. If the ignition cycles match, the data are from the same event. If it is determined that the near deployment data and deployment data are from the same event, control passes to step 340, which indicates that there are multiple events to analyze from the black box data. Further, at step 340, the higher severity event is chosen for use in the analysis.

From step 340, control passes to step 345, in which user input information, such as accident description information as input by the system user, is received. In an example embodiment, the accident description information may include a narrative description of the accident, including such information as impact sequence, direction of impact, weather conditions, claimed passenger injuries, vehicle configuration, pre-accident motion, and the like.

At step 315, if it is determined that no deployment data is available, control passes to step 325, in which it is determined whether near deployment data is available. If it is, control passes to step 335, which indicates that there is a single event from the black box data to analyze. Step 335 is also entered from step 330 if it is determined that the near deployment data and the deployment data are not from the same event. From step 335, control passes to step 345, as discussed above.

If, at step 325, it is determined that there is no near deployment data available, control passes to step 350, at which it is determined whether the event is below the black box data threshold. In an example embodiment, such a threshold may the point at which the EDR is activated, which may be for impacts occurring at approximately 4 mph. If the event is below the threshold, black box data is not used in an analysis of the vehicle accident, as reflected at step 355. If the event is above the threshold, control passes to step 335 and 345, as discussed above.

Next, at step 360, the black box algorithm is performed. The particular algorithm varies depending on the type of EDR present, as will be discussed more fully with respect to the general flow charts of FIGS. 12 and 14 and the more specific flow charts of FIGS. 15-17. Next, control passes in one of two steps, depending on whether there was a single event or multiple events. If there was a single event, control passes to step 365 in which checks are made to determine whether any inconsistencies exist. Then, control passes to step 370, in which a report of impact severity and direction of impact are made for the vehicles involved in the collision. In an example embodiment, the calculations for those values are made in accordance with the above discussion and equations.

If multiple events occurred, control passes from step 360 to step 380, in which the sequence of events is determined. For example, a three car collision may occur in which a first vehicle collides with a second vehicle, which then strikes a third vehicle. In such a collision, the sequence may be determined by reviewing the EDR data along with external information, such as an accident report. Using this information, the sequence may be determined.

Then control passes to step 385, in which a check is made for inconsistencies in the data input. Then control passes to step 390, where a report of impact severity and information on the timing of events and inconsistencies in the data is made for the vehicles involved in the collision.

Figure 10:
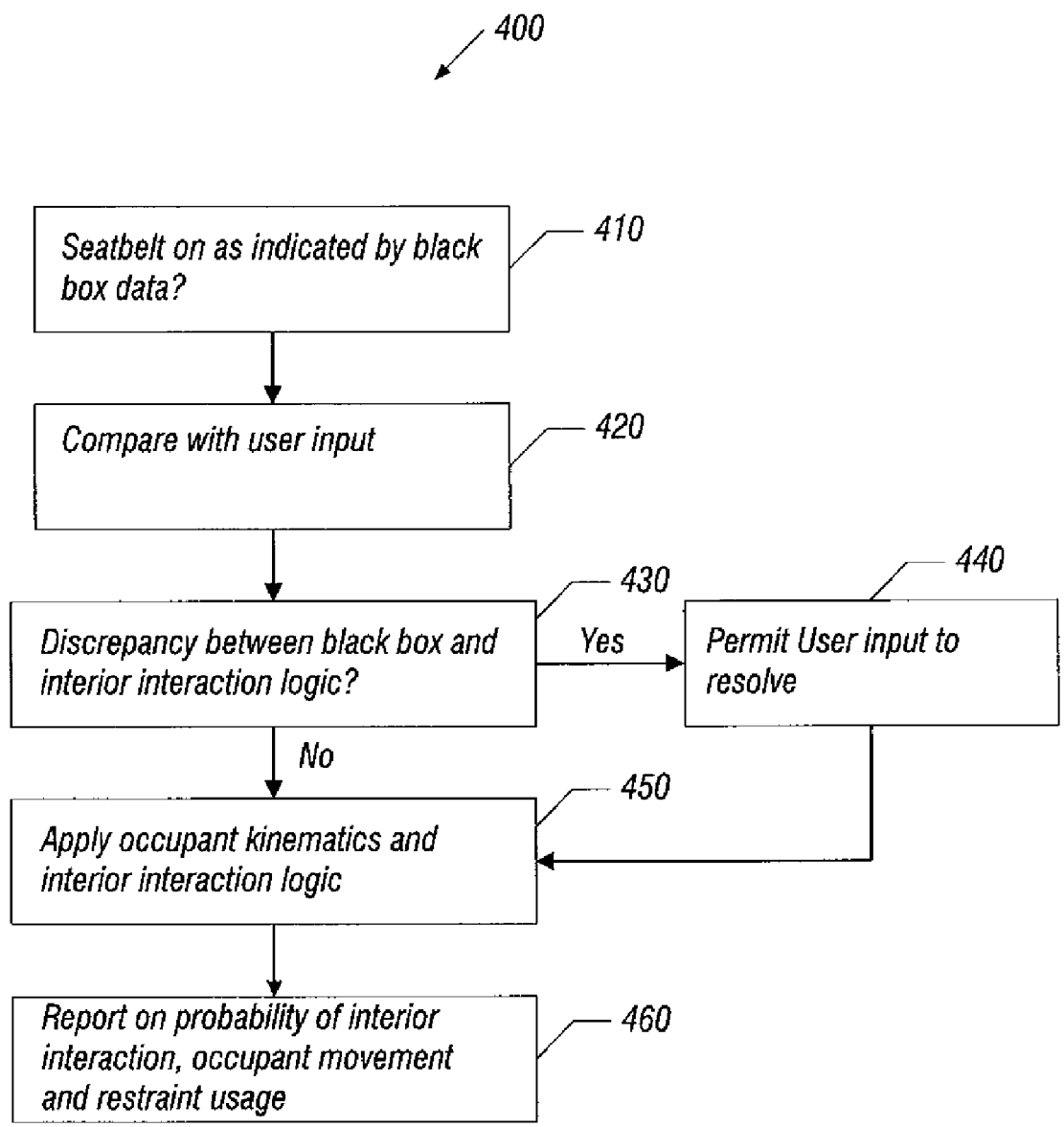
FIG. 10 is a flow chart of an example seatbelt confirmation module in accordance with the present invention.

FIG. 10 is a flow chart of an example seatbelt module 400 for verification of information provided by the EDR. As shown in FIG. 10, module 400 begins with step 410, in which it is determined whether the seatbelt was on at the time of the accident. This is determined by analysis of the driver's belt switch circuit status, as shown in FIG. 1. At step 420, this indication is compared with user input, which is based upon information received by the user from accident reports or the like. At step 430, it is determined whether there are discrepancies between the black box data and the user input. If there are, control passes to step 440, in which the user is requested to input information to resolve the discrepancy. In one embodiment, the user may be provided with a graphical user interface to select whether to use the EDR data or the user-provided data.

Whether there is no inconsistency at step 430 or the inconsistency is resolved at step 440, control passes to step 450, in which rules-based logic is applied to the information as to seat belt usage. In an example embodiment, this rules-based logic includes occupant kinematics and interior interaction logic. For example, the interior environment (based on data in the system as to the particular vehicle) may be analyzed in combination with restraint usage (both passive and active). Further, direction and severity of impact may be analyzed to determine the possible kinematics of the occupants. For example, based on the severity of the impact, direction of the impact, occupant positioning and the use of restraint system(s), the system may determine that the occupant movement of the driver could have caused him to bump his head against the steering wheel (or not).

From this analysis, a report is generated at step 460, which reports on the probability of interior interactions, occupant movement, and restraint system(s) usage, and direction of impact. Such information is useful, for example, in determining comparative negligence, if occupants were not wearing seat belts. Further, such information is useful in determining whether claimed injuries are consistent with the likely kinematics of the injured person. That is, the user or the system can compare the determined likely kinematics against a claimed injury (or claimed kinematics from an accident report) to guard against possible fraud.

Figure 11:
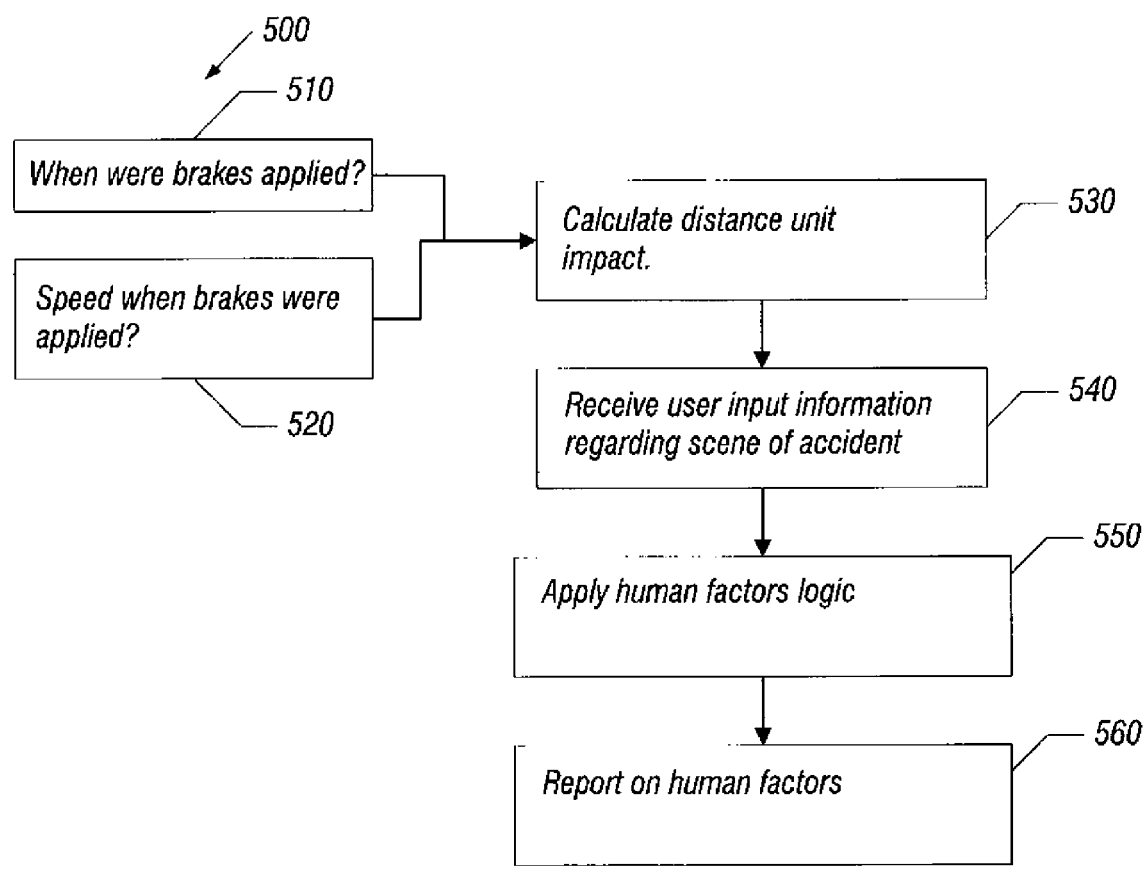
FIG. 11 is a flow chart of an example human factors analysis module in accordance with the present invention.

FIG. 11 is a flow chart of an example module 500 for analysis of human factors in accordance with the present invention. Such an analysis can aid in determination of whether human factors, such as inaction or delayed action, played a part in causing an accident. As shown in FIG. 11, module 500 begins at step 510, in which the system analyzes when the brakes were applied. This information may be obtained from, for example, the pre-crash data obtained from the EDR, which indicates the time (before algorithm enable) at which the brake switch circuit (and thus the brakes) was activated. At step 520, the speed when the brakes were applied is also analyzed by the system. This information may also be obtained from the EDR, which indicates the vehicle speed at the time when the brake switch circuit was activated.

The information obtained at steps 510 and 520 may then be used at step 530 in a calculation of the distance from when the brakes were applied until impact. Next, at step 540, the system accepts an input of information regarding the scene of the accident. Such information may include, for example, weather conditions, skid marks, type of roadway, vehicle location, and the like. At step 550, human factors logic is applied to the information in order to generate a report on human factors at step 560. In an example embodiment, the human factors logic may determine whether the driver of the vehicle containing the EDR recognized that an accident was imminent and/or could have avoided the accident by earlier application of the brakes or the like.

Since data from the EDR is a direct measurement of the crash, the impact severity calculated from this data may be compared to, combined with, and/or possibly be given preference over other methods currently used by a computer-based system. For example, the impact severity calculated from the EDR data may be compared to impact severity determined by a computer implemented method for accident analysis, such as that disclosed in U.S. Pat. No. 6,381,561.

Figure 12:
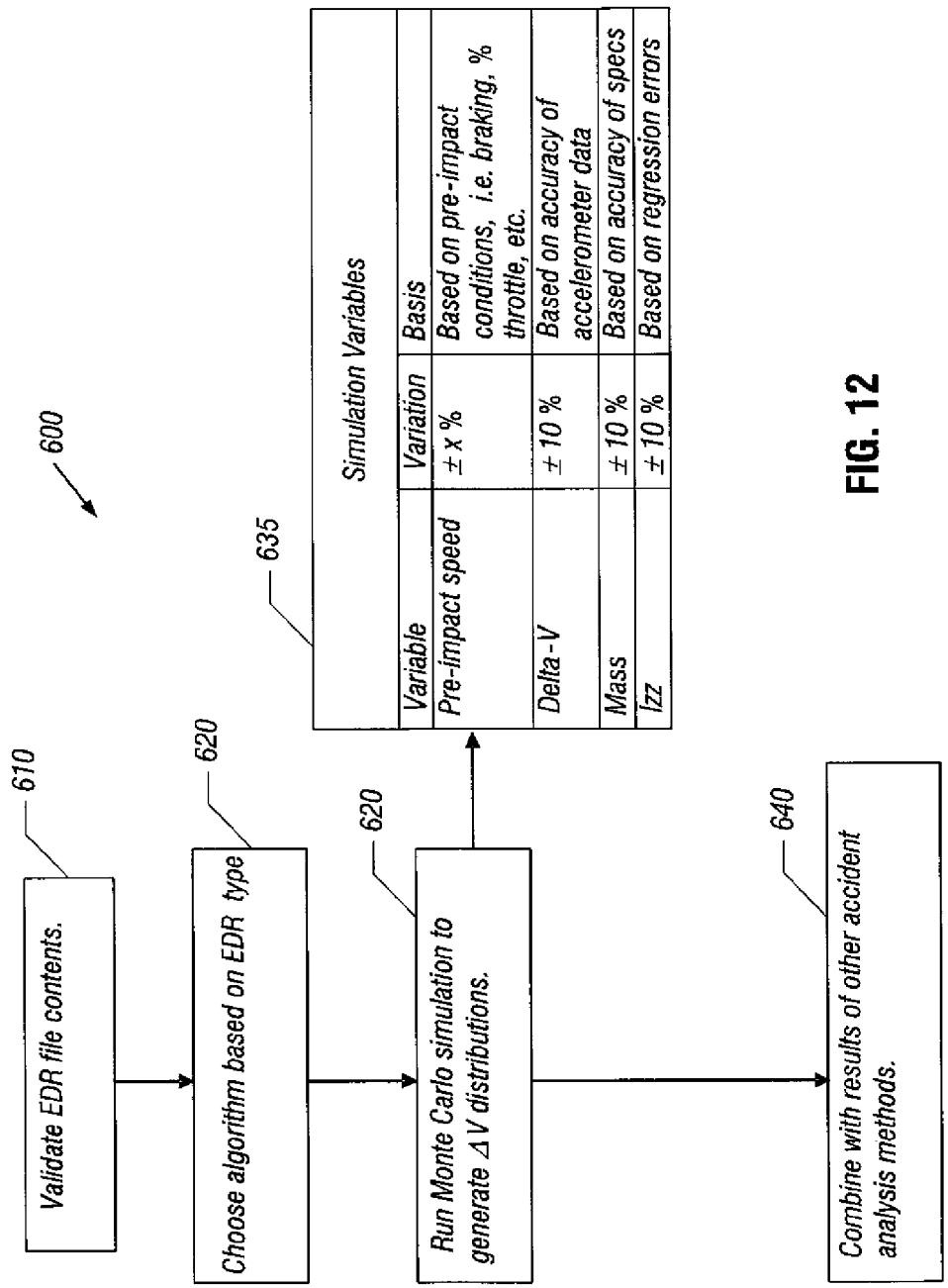
FIG. 12 is a flow chart of an example method combining various impact severity determinations in accordance with the present invention.

FIG. 12 is a flow diagram of an example method according to the present invention in which a Delta-V determined from EDR data is combined with such information determined without EDR data. As shown in FIG. 12, method 600 begins at step 610, in which the contents of an EDR data file obtained from the vehicle is validated. Such validation includes, for example, a check of the VIN number to confirm that the file is for the correct vehicle to be analyzed. When the file contents have been validated, control passes to step 620 in which an algorithm is selected based on the type of event data recorder, for example, that used in GM or Ford models. Such a selection may be based in an example embodiment on analysis of the VIN number, as the manufacturer is coded therein.

Depending on the particular recorder used, the system will choose a preselected algorithm for the type of EDR, as will be discussed in more detail in connection with FIGS. 14-17. Next, at step 630, a Monte Carlo simulation is run to generate distributions for Delta-V. In an example embodiment, the simulation may be run in accordance with the flow diagram of FIG. 7. Block 635 shows an example list of simulation variables, which may include pre-impact speed, Delta-V, mass and Izz. Furthermore, for certain EDRs, for example, those used on GM models, the system may use the algorithms set forth above as equations 28 and 29 to account for the underestimation of change in velocity.

After the Monte Carlo analysis has been completed, control passes to step 640, in which the resultant Delta-V is combined with the results of Delta-V for the same vehicle accident calculated via one or more other methods. Such methods may include those disclosed in U.S. Pat. No. 6,381,561. Because of the reliability of the Delta-V obtained from EDR data, this value may be weighted more heavily. In the example embodiment of FIG. 12, the Delta-V obtained via the EDR data may be weighted 10 times that of the other data points. However, in other embodiments, the EDR-obtained Delta-V may be weighted more or less than that determined by other means. In such manner, an accurate determination of Delta-V may be made.

Figure 13:
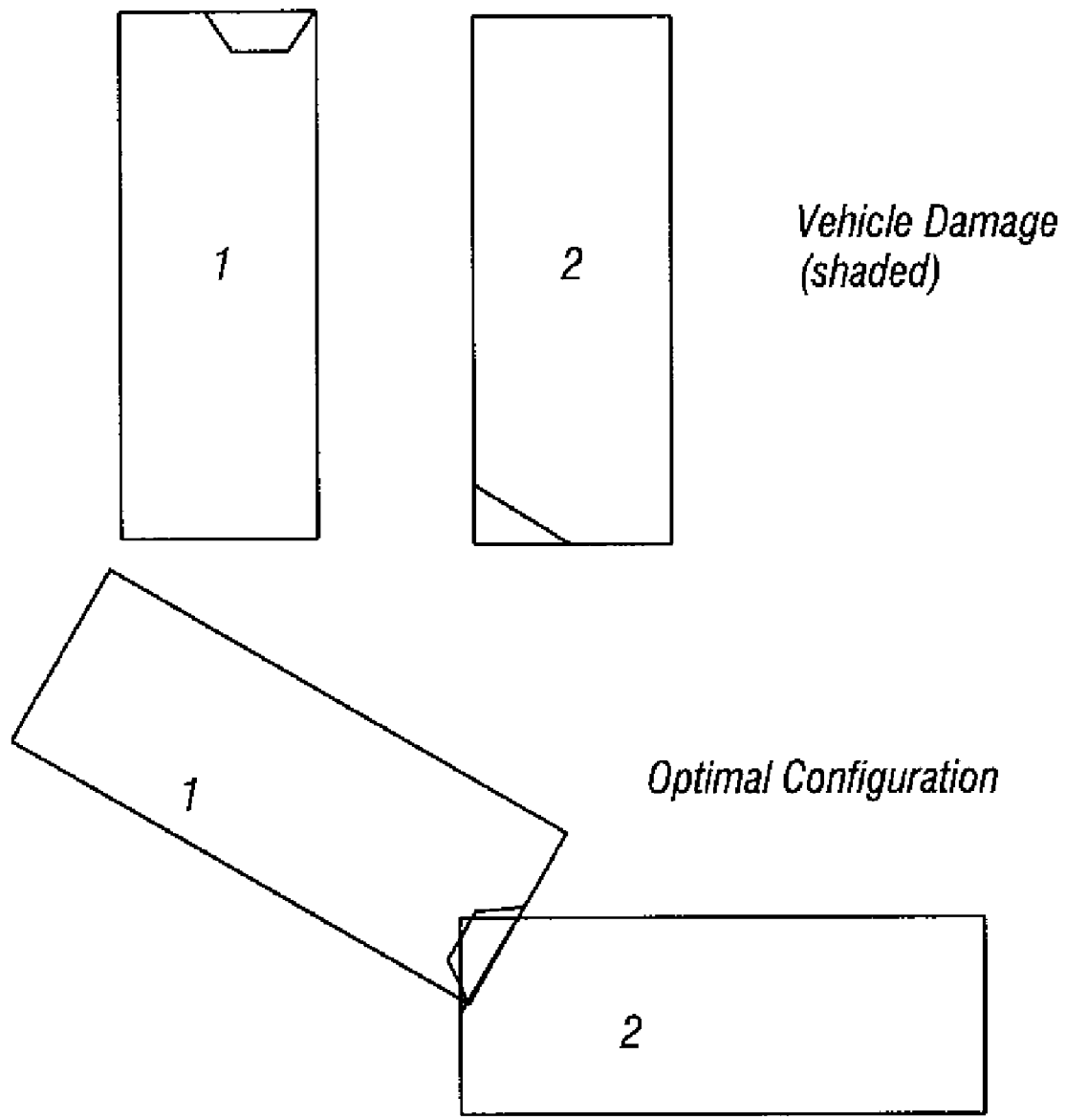
FIG. 13 is a block diagram of an optimal accident configuration of an accident involving a first vehicle and a second vehicle.

In certain embodiments, it may be desirable to determine the configuration of the accident to aid in determining impact severity. In one such embodiment, an accident configuration module calculates the point of impact and angle of impact between two vehicles in a collision. It does this by first gathering information about the property damage to the subject vehicles, i.e., where on the vehicles is there contact/crush damage and what is the extent of this contact/crush damage (i.e., how wide/how deep). The module then computes the center of the damaged area on each vehicle. The vehicles are positioned such that the damage centers (or centroids) on each vehicle coincide. Finally, an optimization problem is solved to compute the "best" angle of impact. This optimal impact angle simultaneously maximizes the overlapping damaged area, while minimizing any overlap of non-damaged vehicle areas (see FIG. 13). In certain embodiments, the user may have the option of overriding this optimal configuration with a user-defined accident configuration.

Figure 14:
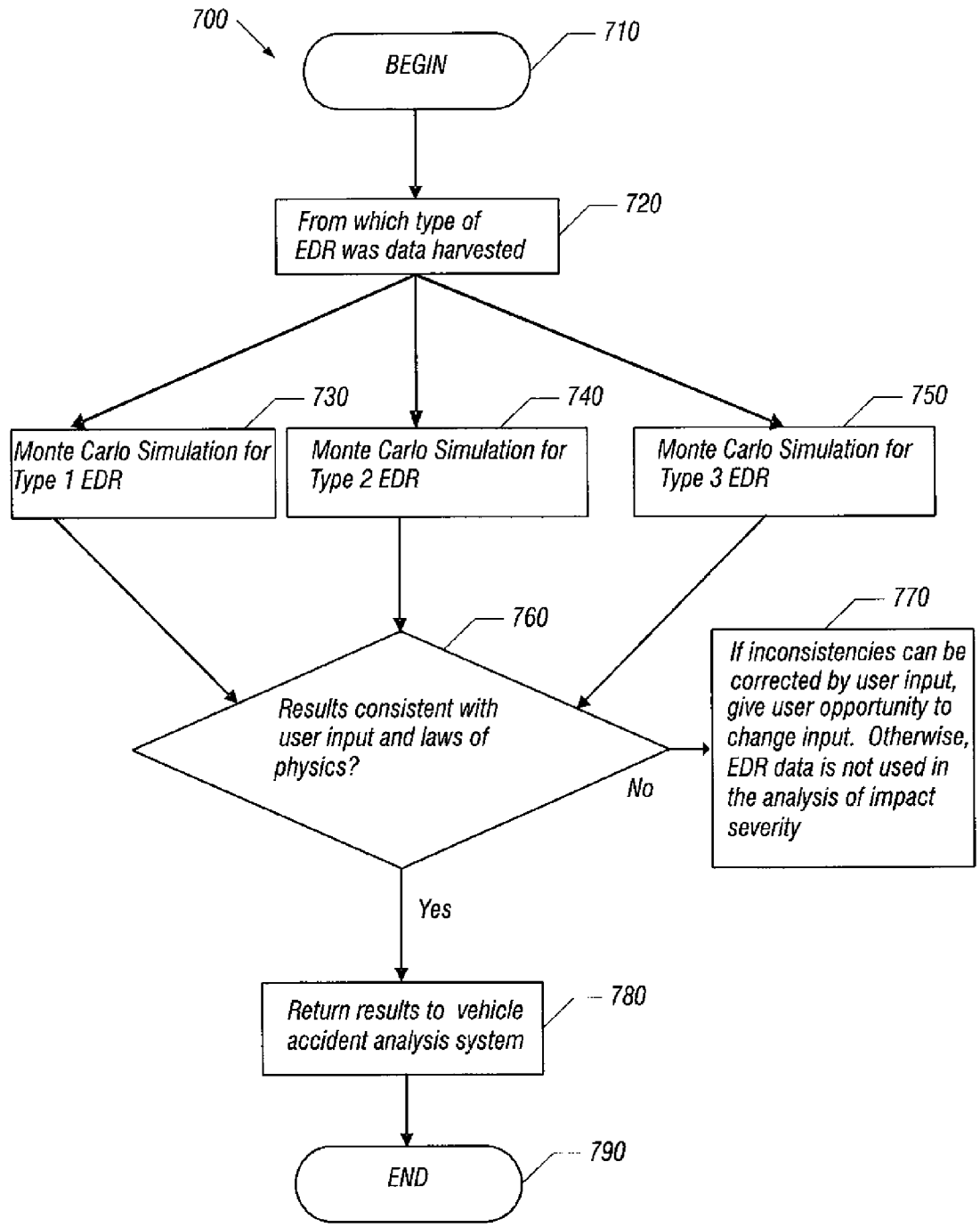
FIG. 14 is a flow chart of an example method in accordance with the present invention.

FIG. 14 is a flow chart of another example embodiment of a module according to the present invention using black box data to analyze a vehicle accident. This embodiment determines what type of EDR (Type 1, 2, or 3) is accessed and a Monte Carlo simulation is run on the data obtained, the results of which are then analyzed for consistency with physical laws. As discussed above, different information is obtained depending on the type of EDR which is available. For example, a type 1 EDR records data relating to Delta-V, pre-crash speed, pre-crash engine speed, pre-crash percentage throttle and pre-crash braking. A type 2 EDR records data relating to pre-crash speed, pre-crash engine speed, pre-crash percentage throttle and pre-crash braking. Finally, a type 3 EDR records Delta-V data only. While the following discussion relates to these types of EDR's, it is to be understood that the methods and system disclosed herein may be used with other EDR's presently available or available in the future.

As shown in FIG. 14, the process begins at step 710. At step 720, the system determines whether the EDR data was obtained from a Type 1, 2, or 3 EDR. Next, depending on the determination made at step 720, control passes to one of steps 730, 740, or 750 in order to process the data obtained and engage in a Monte Carlo simulation based on the EDR data and user input information. This information may include, for example, vehicle pre-impact motion, vehicle property damage and road surface conditions.

The results from the Monte Carlo simulation are then returned, and at step 760, the system determines whether the results are consistent with user input information and the laws of physics. If the results are consistent, control passes to step 780 in which the results obtained are returned to a vehicle accident analysis system, which may use the results determined from EDR data in connection with analysis of the accident. Alternately, the results may be simply output to the end user for analysis and use apart from a separate vehicle accident analysis system. The method ends at step 790.

Alternately, if it is determined at step 760 that the results are not consistent, control passes to step 770 to determine whether the user desires to change the data input and rerun the analysis. If the user does not do so, the results determined from EDR data are not used in connection with analysis of the accident.

Figure 15A:
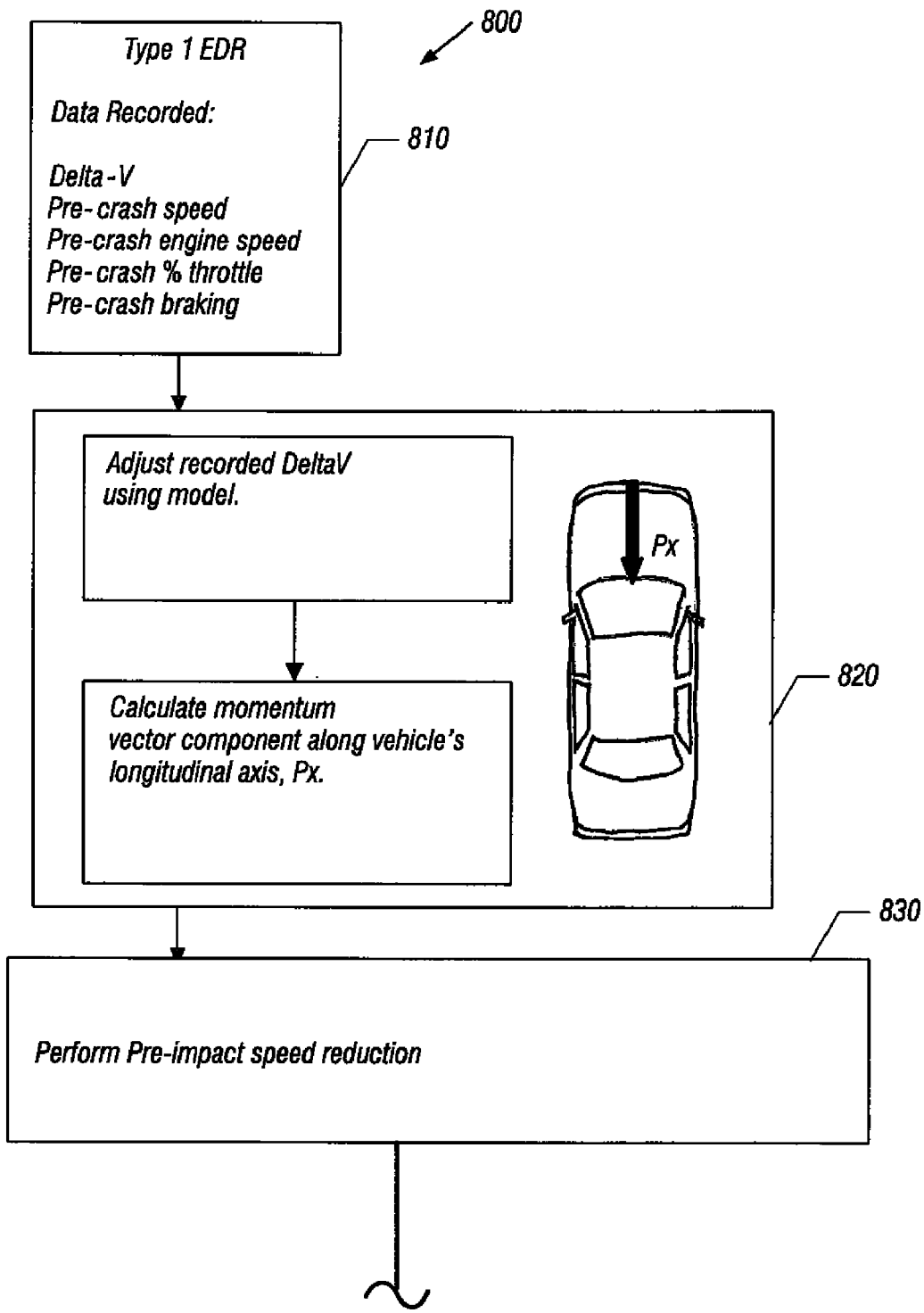
FIGS. 15A-C together are a flow chart of an example method for using Type 1 EDR data in accordance with the present invention.
Figure 15B:
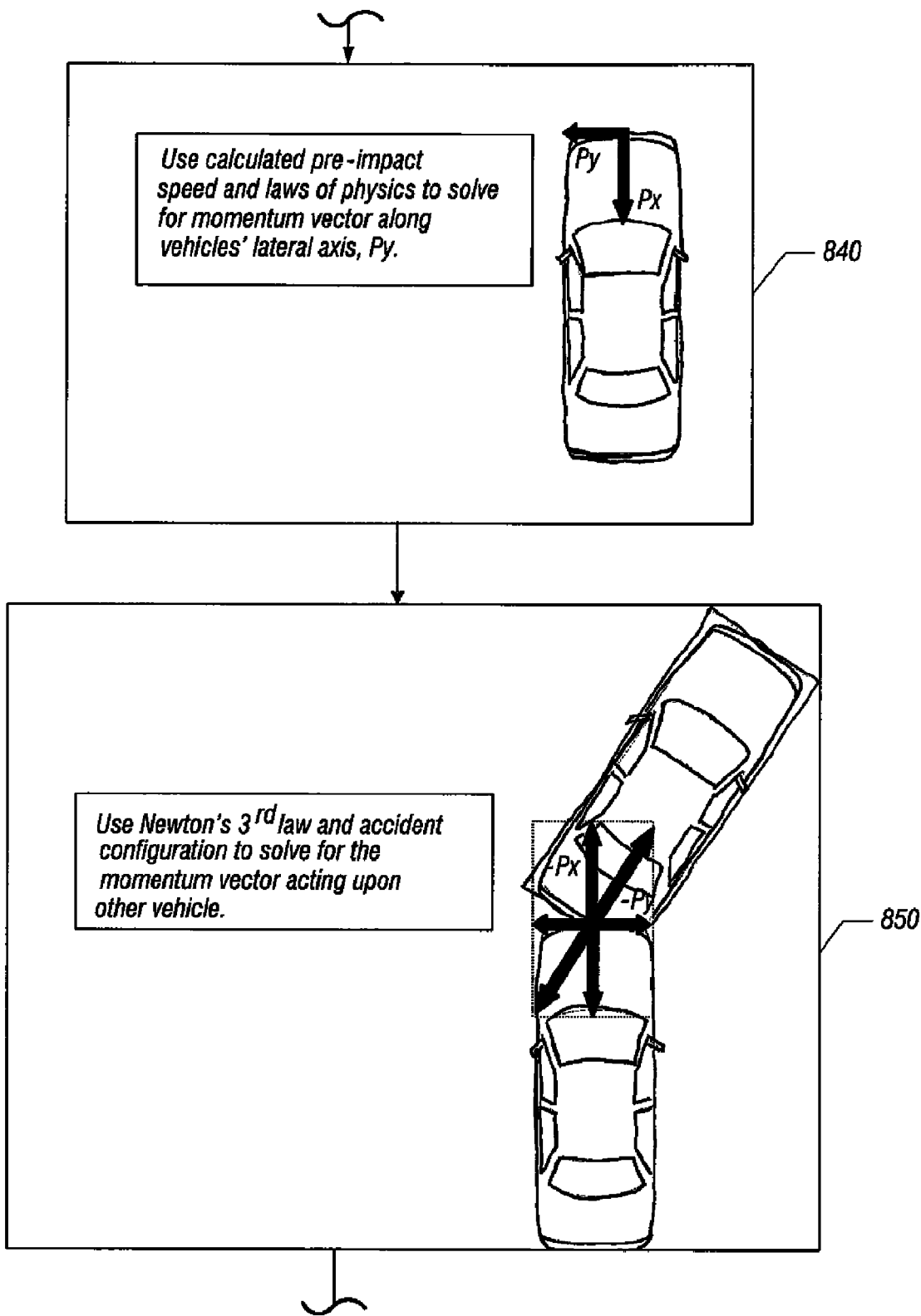
Figure 15C:
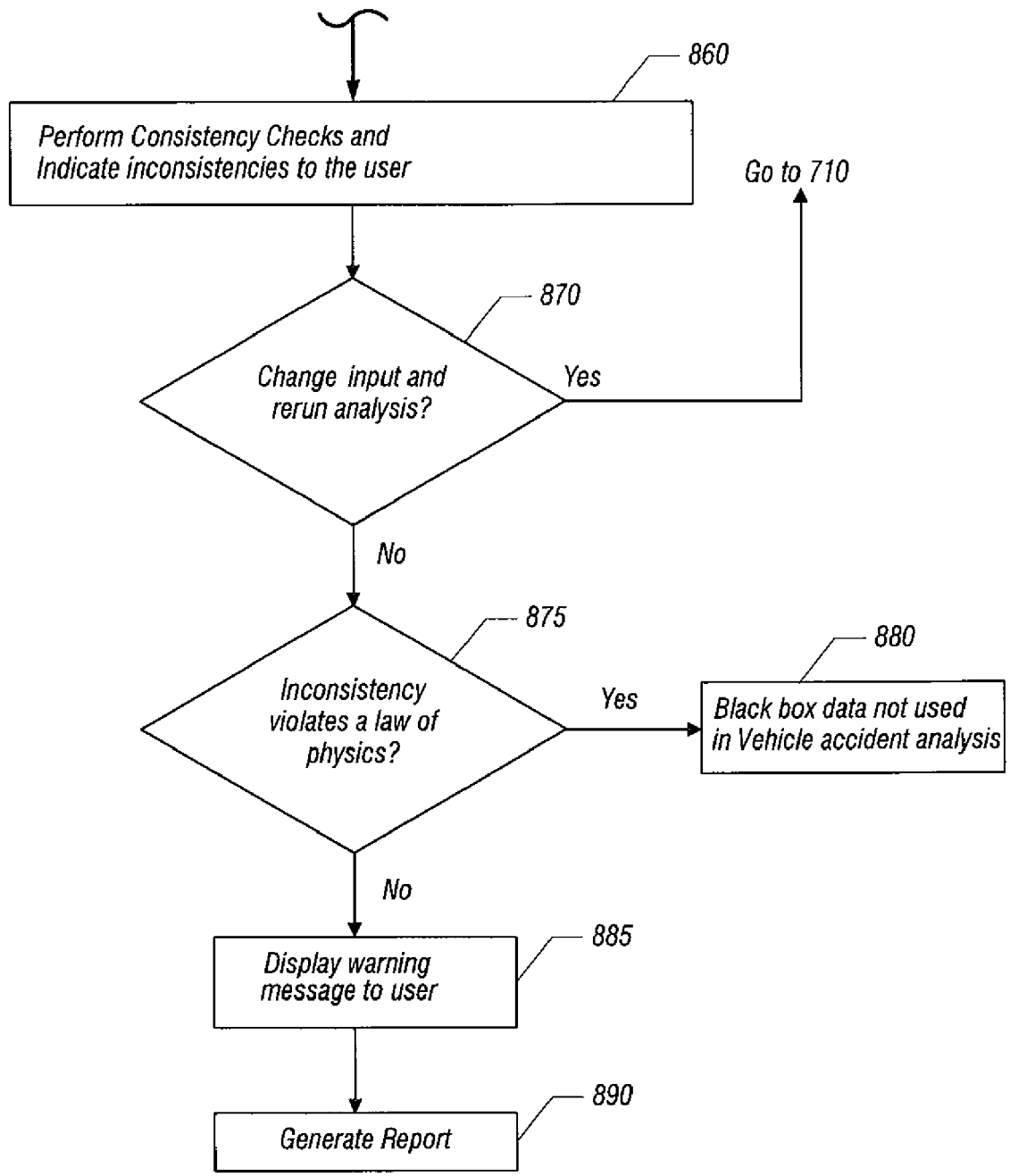

FIGS. 15A-C together are a flow chart for an example module 800 to analyze black box data for a type 1 EDR according to a black box algorithm. As shown in FIG. 15A at step 810, the recorded data for a type 1 EDR is obtained. The information obtained from the EDR includes Delta-V, pre-crash speed, pre-crash engine speed, pre-crash percentage throttle and pre-crash braking. At step 820, the recorded Delta-V is adjusted. In an example embodiment, the Delta-V may be adjusted in accordance with the discussion of equations 28 and 29 above. However, it is to be understood that in other embodiments, Delta-V need not be adjusted. Also at step 820, the momentum vector component along the vehicle's longitudinal access, $P_X$ is calculated using the adjusted Delta-V value, DV'. This momentum vector is calculated according to the equation:

$$P_X = \text{mass} * DV' \tag{30}$$

Next, at step 830, the pre-impact speed is reduced to account for pre-impact braking. If braking occurred at minus one second prior to impact, constant braking deceleration over a [0,1] second time interval is used to compute a reduced pre-impact speed. This pre-impact speed may be calculated according to the equation:

$$V_{reduced} = V - \tfrac{1}{2}(f*g)t^2 \tag{31}$$

where V is a vehicle speed at minus one second pre-impact, f is the road friction coefficient, g is the gravitational acceleration and t is a period of time in the range [0, 1] second.

At step 840, the momentum vector along the vehicle's lateral axis, $P_y$ is calculated using the pre-impact speed and the laws of physics. At step 850, the momentum vector acting upon the second vehicle is determined by using Newton's $3^{rd}$ law of physics and the accident configuration, as determined by an accident configuration module. While not shown as such in FIG. 15, it is to be understood that the above steps may be subjected to a Monte Carlo simulation in which the input distributions are randomly sampled and $\Delta V$ computed in a loop until the desired sample size is achieved, or until the maximum number of loops has been exceeded.

At step 860, consistency checks are made to determine and indicate inconsistencies to the user. In an example embodiment, these inconsistencies may relate to airbag deployment, seatbelt usage, and accident severity compared to other methods. Further, because of the information provided by a Type 1 EDR, the pre-impact speed of the second vehicle can be estimated, which can then be compared with the pre-impact motion of the second vehicle as entered by the user. Thus, at step 860 any inconsistencies in these parameters are indicated to the user. Then at step 870, the user is queried to input whether he wants to change an input and rerun the analysis. If the user wishes to rerun the analysis, control passes to step 810 in which the method is begun again. Otherwise, control passes to step 875 where it is determined whether the inconsistency violates a law of physics. If the inconsistency does in fact violate a law of physics, at step 880 black box data is not used in further vehicle damage analysis. If the inconsistency does not violate a law of physics, control passes to step 885 where a warning is displayed to the user. Finally at step 890, a report is generated regarding any inconsistencies determined by the module. Further, while not shown in FIG. 15, the information determined by the module may be reported to additional vehicle accident analysis systems for further use. Also, the results may be simply output to the end user for analysis and use apart from a separate vehicle accident analysis system.

Figure 16A:
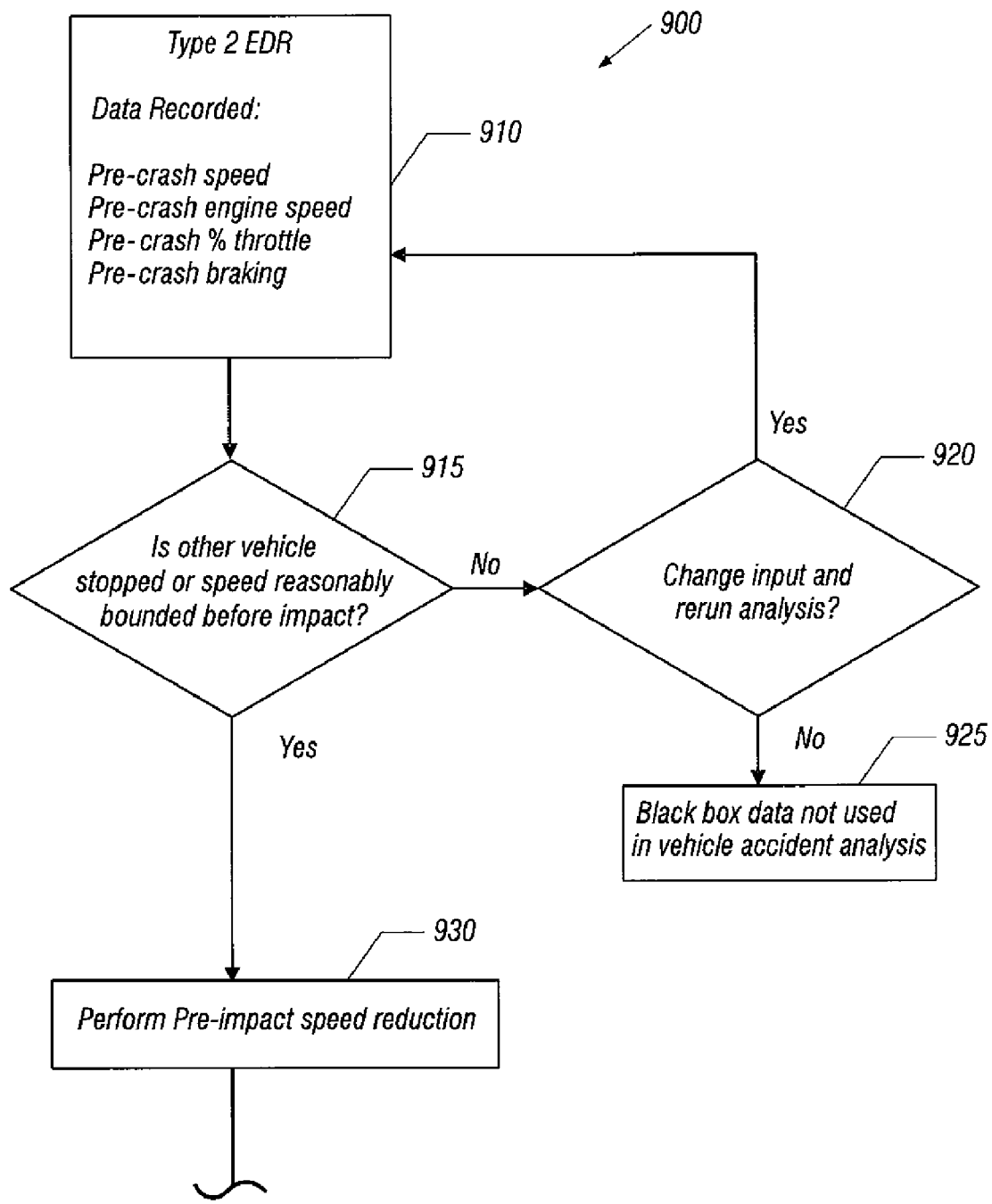
FIGS. 16A-B together are a flow chart of an example method for using Type 2 EDR data in accordance with the present invention.
Figure 16B:
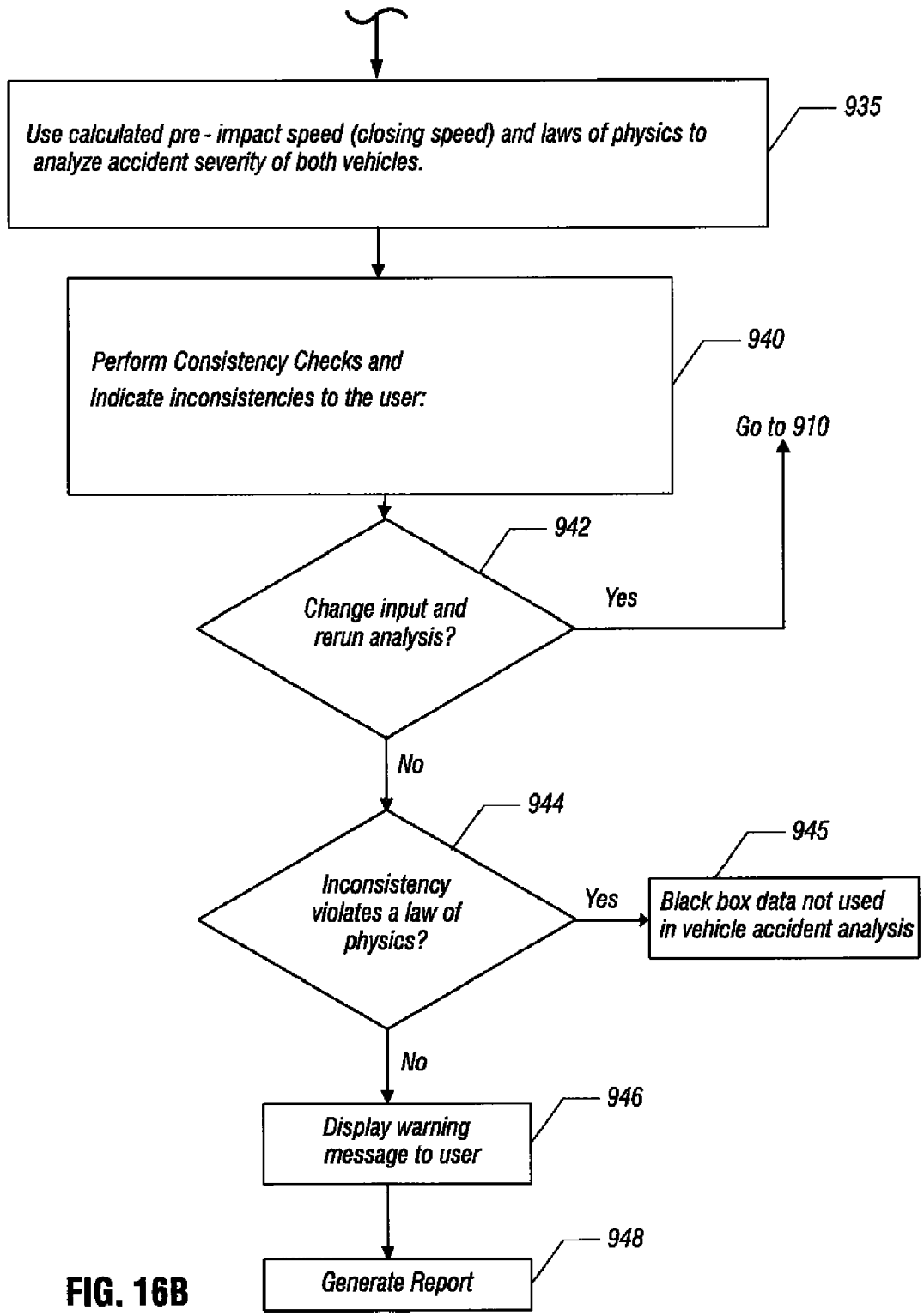

FIGS. 16A and B together are a flowchart of an example module for analyzing a vehicle accident using data from a Type 2 EDR according to a black box algorithm. As shown in FIG. 16A, module 900 begins at step 910 in which the data recorded by the EDR is obtained. As discussed above this information includes pre-crash speed, pre-crash engine speed, pre-crash percent throttle and pre-crash braking. At step 915, the user is queried as to whether the other vehicle was stopped, speed known or reasonably bounded prior to impact. If the user answers no, control passes to step 920 in which the user is prompted to state whether he desires to change the input and rerun the analysis. If the user answers yes, control passes to step 910 and the method begins again. Otherwise, control passes step 925, and black box data is not used in further vehicle accident analysis.

From step 915 if the user indicates that the other vehicle's speed was known or reasonably bounded prior to impact, control passes to step 930 in which the pre-impact speed is reduced, as discussed above with regard to FIG. 15. At step 935, the closing speed and the laws of physics are used to analyze the accident severity of both vehicles. Then at step 940 consistency checks are made. These consistency checks may include airbag deployment, seat belt usage and accident severity as compared to other methods. The user is then prompted at step 942 as to whether he desires to change input values and rerun the analysis. If the user answers yes, control returns to step 910. Otherwise, control passes to step 944 in which it is determined whether an inconsistency violates a law of physics. If it does, at step 945 black box data is not used in analysis of the vehicle collision. If a law of physics is not violated, control passes to step 946 in which a warning message is displayed to the user. Finally, at step 948 a report is generated. As discussed above, while not shown in FIG. 16, the information determined may be reported to additional vehicle accident analysis systems and/or be analyzed and used apart from such a system. Further, it is to be understood that the above steps may be performed iteratively according to a Monte Carlo simulation, as discussed above in connection with FIG. 15.

Figure 17A:
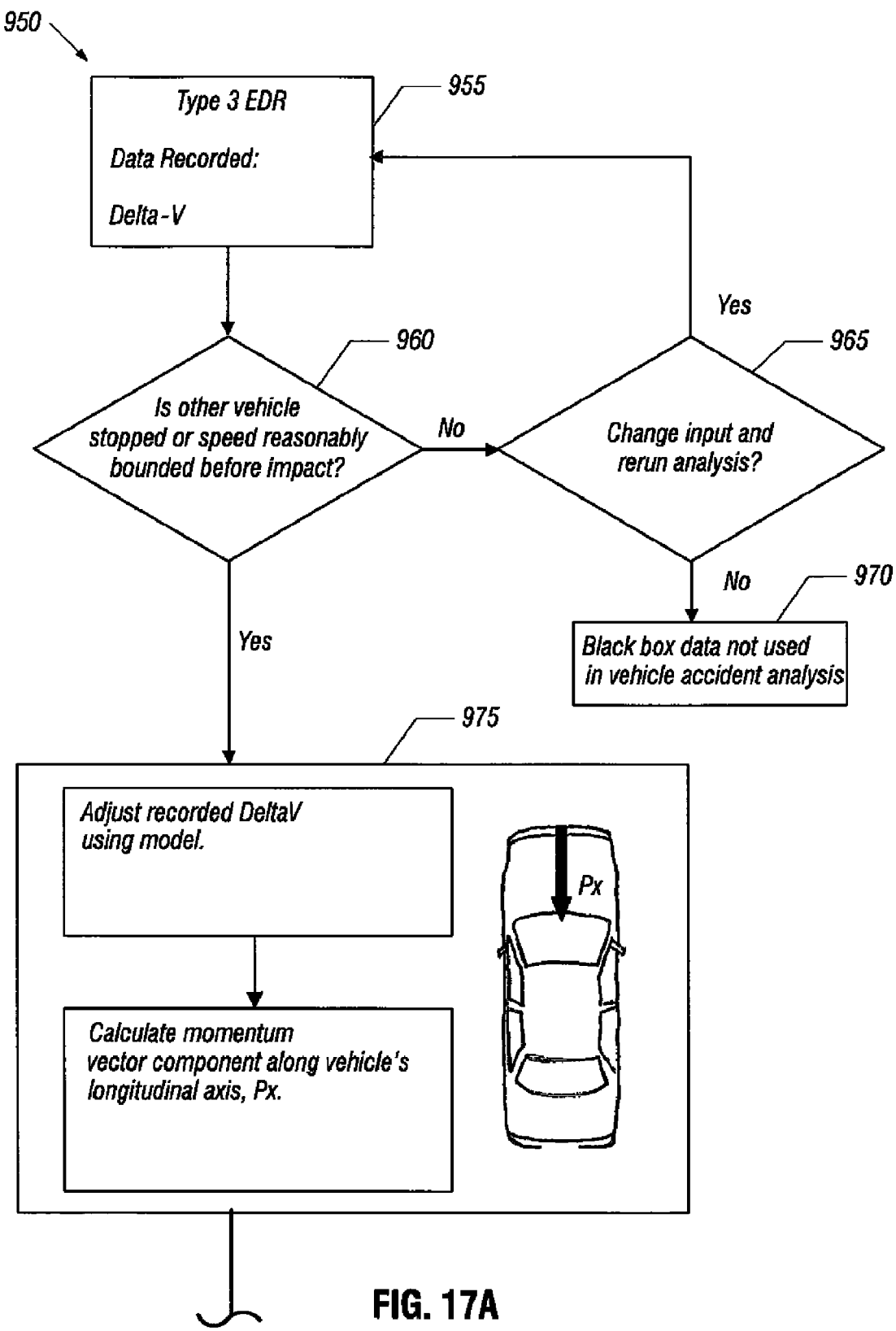
FIGS. 17A-B together are a flow chart of an example method for using Type 3 EDR data in accordance with the present invention.
Figure 17B:
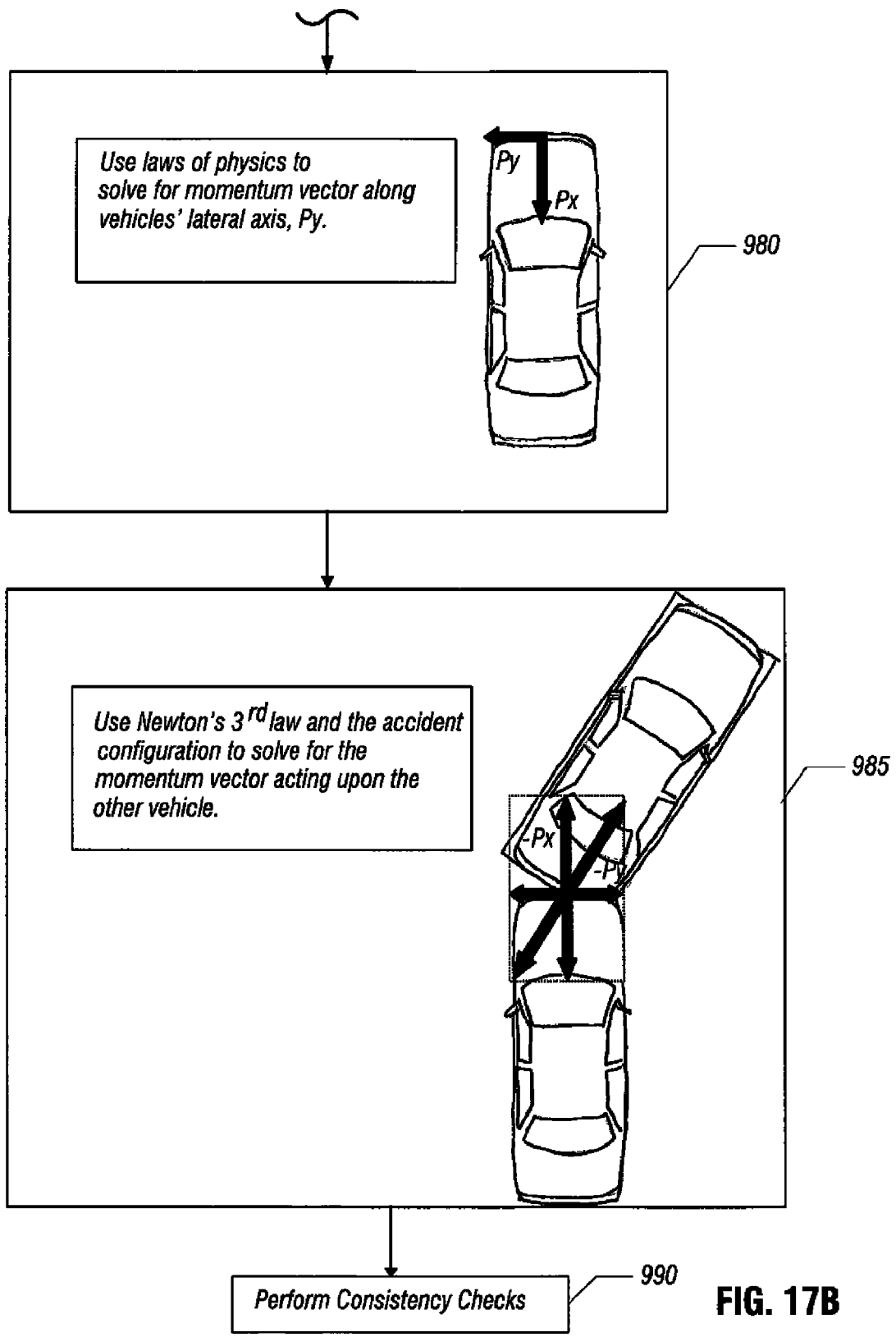

FIGS. 17A and B together are a flowchart of an exemplary method according to the present invention using black box information from a type 3 EDR in a vehicle accident analysis module according to a black box algorithm. As shown in FIG. 17A, method 950 begins at step 955 in which data is obtained from the EDR. As discussed above, a Type 3 EDR provides information regarding Delta-V only. Control then passes to step 960 in which the user is queried as to whether the other vehicle was stopped, speed known or reasonably bounded prior to impact. If the user answers no, control passes to step 965 in which the user is queried whether he desires to change his input and rerun his analysis. If the answer is yes, control passes back to step 955 to begin the analysis again. Otherwise, control passes to step 970 in which the black box data is not used for further processing and analysis of the vehicle accident. If, at step 960 the user inputs yes, control passes to step 975 in which the recorded Delta-V is adjusted as discussed above with regard to FIG. 15. Furthermore, in step 975 the momentum vector component along the vehicle's longitudinal axis $P_x$ is calculated as discussed above with respect FIG. 15. Next, at step 980 the momentum vector along the vehicle's lateral axis, $P_y$ is determined using the laws of physics, similar to that discussed above with respect to FIG. 15. Next, at step 985 the momentum vector acting upon the second vehicle is determined as discussed above with respect to FIG. 15. Finally, at step 990 consistency checks are made as discussed above with respect to FIG. 15. Then, while not shown in FIG. 17, the information determined may be reported to additional vehicle accident analysis systems and/or be analyzed and used apart from such a system. Further, it is to be understood that the above steps may be performed iteratively according to a Monte Carlo simulation, as discussed above in connection with FIG. 15.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A computer-implemented method for assessing impact severity of an accident involving a vehicle, comprising:
   receiving black box information obtained from an event data recorder of the vehicle at a computer system remote from the vehicle, the black box information comprising at least one of a pre-impact speed of the vehicle and a change in velocity of the vehicle;
   determining in the computer system the impact severity of the vehicle and a second vehicle, by modeling the impact severity in the computer system using the black box information, including performing a simulation to generate a distribution from simulation values including at least one of the pre-impact speed and the change in velocity; and
   outputting the impact severity from the computer system.

2. The method of claim 1, further comprising checking for inconsistencies within the black box information using second information obtained independently of the event data recorder.

3. The method of claim 1, further comprising determining a principal direction of force upon the vehicle.

4. The method of claim 1, further comprising:
   determining, in the computer system, from the black box information whether a passive restraint system was in use;
   applying, in the computer system, a preselected set of rules to determine a probability of interior interaction and occupant movement; and
   reporting the probability of interior interaction and the occupant movement from the computer system.

5. The method of claim 1, further comprising:
   modifying the change in velocity using a first preselected value to obtain a first limit change in velocity; and modifying the change in velocity using a second preselected value to obtain a second limit change in velocity, the second limit change in velocity greater than the first limit change in velocity.

6. The method of claim 2, further comprising reporting the inconsistencies, and further comprising reporting a sequence of events including information on timing of the sequence of events.

7. The method of claim 3, further comprising determining a range of potential injury of an occupant of the vehicle based on the principal direction of force and a change in velocity of the vehicle.

8. The method of claim 4, further comprising comparing at least a portion of the black box information to a user input relating to the passive restraint system use to determine whether a discrepancy exists.

9. The method of claim 4, further comprising comparing the probability of interior interaction and the occupant movement to user input information, the user input information relating to claimed occupant injury.

10. The method of claim 5, further comprising determining whether the event data recorder is of a preselected type.

11. The method of claim 5, wherein the low limit change in velocity is determined in accordance with $\Delta V_{low} = \Delta V_{SDM} - 0.10(\Delta V_{SDM}) + \Delta V_{err\_lower95}$ and the high limit change in velocity is determined in accordance with $\Delta V_{high} = \Delta V_{SDM} + 0.10(\Delta V_{SDM}) + \Delta V_{err\_upper95}$.

12. The method of claim 5, further comprising providing the first limit change in velocity and the second limit change in velocity to a Monte Carlo analysis module.

13. The method of claim 7, further comprising reporting the range of potential injury from the computer system.

14. The method of claim 8, further comprising permitting a user to resolve the discrepancy.

* * * * *